United States Patent
Hiraoka et al.

(10) Patent No.: US 9,538,191 B2
(45) Date of Patent: Jan. 3, 2017

(54) MOVING IMAGE CODING APPARATUS, CODE AMOUNT CONTROL METHOD, AND STORAGE MEDIUM

(71) Applicant: MegaChips Corporation, Osaka-shi (JP)

(72) Inventors: Takuya Hiraoka, Osaka (JP); Akira Okamoto, Osaka (JP)

(73) Assignee: MegaChips Corporation, Osaka-shi (JP)

(*) Notice: Subject to any disclaimer, the term of this patent is extended or adjusted under 35 U.S.C. 154(b) by 427 days.

(21) Appl. No.: 14/103,060

(22) Filed: Dec. 11, 2013

(65) Prior Publication Data

US 2014/0192864 A1 Jul. 10, 2014

(30) Foreign Application Priority Data

Dec. 11, 2012 (JP) .................. 2012-270139

(51) Int. Cl.
*H04N 7/12* (2006.01)
*H04N 11/02* (2006.01)
(Continued)

(52) U.S. Cl.
CPC .......... *H04N 19/124* (2014.11); *H04N 19/126* (2014.11); *H04N 19/15* (2014.11);
(Continued)

(58) Field of Classification Search
CPC .............................. H04N 7/50; H04N 7/26244
See application file for complete search history.

(56) References Cited

U.S. PATENT DOCUMENTS

2006/0045186 A1* 3/2006 Koto ...................... H04N 19/56
375/240.16
2012/0287990 A1 11/2012 Tatsuka et al.

FOREIGN PATENT DOCUMENTS

JP 2011-146883 7/2011
JP 2011-217085 10/2011
WO WO 2012/117955 A1 9/2012

OTHER PUBLICATIONS

U.S. App. No. 14/001,980, filed Aug. 28, 2013, Naotsugu Yamamura et al.
(Continued)

*Primary Examiner* — Chikaodili E Anyikire
(74) *Attorney, Agent, or Firm* — Oblon, McClelland, Maier & Neustadt, L.L.P.

(57) ABSTRACT

A moving image coding apparatus, a code amount control method, and a code amount control program enable appropriate code amount control to be performed in units shorter than frames. The moving image coding apparatus includes a coding unit, a quantization parameter determination unit, and a target code amount setting unit. The target code amount setting unit designates the number of macroblocks and sets a target code amount as a code amount to be allocated to the designated number of macroblocks. The quantization parameter determination unit calculates, for each macroblock, a quantization parameter to be used in quantization of a current macroblock based on a sum of absolute transformed differences SATD used in a motion estimate process. The moving image coding apparatus performs quantization using the calculated quantization parameter value.

7 Claims, 8 Drawing Sheets

(51) Int. Cl.
*H04N 11/04* (2006.01)
*H04N 19/124* (2014.01)
*H04N 19/176* (2014.01)
*H04N 19/126* (2014.01)
*H04N 19/196* (2014.01)
*H04N 19/15* (2014.01)
*H04N 19/137* (2014.01)

(52) U.S. Cl.
CPC ......... *H04N 19/176* (2014.11); *H04N 19/198* (2014.11); *H04N 19/137* (2014.11)

(56) References Cited

OTHER PUBLICATIONS

U.S. Appl. No. 14/049,353, filed Oct. 9, 2013, Takuya Hiraoka et al.

* cited by examiner

MOVING IMAGE CODING APPARATUS, CODE AMOUNT CONTROL METHOD, AND STORAGE MEDIUM

BACKGROUND OF THE INVENTION

Field of the Invention

The present invention relates to a technique for coding moving images (video) for the compression of moving images (video), and more particularly, to a technique for controlling the code amount in the compression of moving images (video).

Description of the Background Art

In the compression of moving images (video), the code amount is typically adjusted in units of relatively long periods of time. For example, the code amount is controlled in units of Group Of Pictures (GOPs) or in units of frames. For the control in units of frames, the amount of code to be allocated to each frame is set, and the amount of code to be generated for each frame is controlled not to exceed the set code amount. For example, the code amount to be generated is controlled not to exceed the set code amount by, for example, adjusting a quantization parameter for each macroblock included in the frame.

For the control in units of GOPs or in units of frames, the code amount is adjusted in units of long periods of time. This control allows the code amount to have a relatively large peak value, and thus achieves a higher image quality. However, a longer delay time occurs in the compression of moving images (video) as the code amount is adjusted in longer periods of time. Under stringent requirements to reduce delays, such as when the moving images are transferred in real time, the code amount needs to be controlled in the shortest possible periods of time.

Patent Literature 1 describes a technique for controlling the code amount by setting a target code amount in units shorter than frames, or in units of predetermined numbers of macroblocks less than the total number of macroblocks included in one frame.

CITATION LIST

Patent Literature

Patent Literature 1: Japanese Unexamined Patent Publication No. 2011-146883

With the technique described in Patent Literature 1, however, the quantization parameter value is adjusted through thresholding based on the sum of absolute differences (SAD) of prediction errors that can occur in searching the current macroblock (macroblock being processed) for motions. This technique may disable appropriate control of the code amount. The SAD of prediction errors that can occur in searching the current macroblock for motions is the simple sum of differences between the current macroblock and each macroblock to be compared with the current macroblock. The SAD thus fails to reflect variations in the differences or variations in the frequency components, and correlates weakly with the code amount to be generated. Adjusting the quantization parameter value based on the SAD of prediction errors in searching the current macroblock (macroblock being processed) for motions would thus cause the code amount to greatly deviate from the actually generated code amount. This may cause inappropriate control of the code amount. Further, the technique described in Patent Literature 1, which adjusts the quantization parameter value through thresholding, may cause inappropriate control of the code amount depending on the set threshold.

It is an object of the present invention to provide a moving image coding apparatus, a code amount control method, and a code amount control program that enable appropriate control of the code amount in units shorter than frames.

SUMMARY OF THE INVENTION

To solve the above problem, a first aspect of the present invention provides a moving image coding apparatus that codes a moving image signal for forming a frame image including a plurality of macroblocks, and controls an amount of code to be generated in coding the moving image signal. The apparatus includes a target code amount setting unit, a quantization parameter determination unit, a coding unit, a storage unit, and a motion estimate unit.

The target code amount setting unit designates the number of macroblocks and sets a target code amount as a code amount to be allocated to the designated number of macroblocks.

The quantization parameter determination unit determines a quantization parameter value to be used in quantization performed in coding a moving image.

The coding unit codes the moving image signal. The coding unit also performs quantization with respect to the moving image signal using the quantization parameter value determined by the quantization parameter determination unit.

The coding unit includes a storage unit and a motion estimate unit.

The storage unit stores at least one previous frame image.

The motion estimate unit obtains a difference image by extracting a reference frame image from the at least one previous frame image stored in the storage unit and calculating a difference between a current macroblock that is a processing target macroblock and an image region of the reference frame image having the same size as the current macroblock, obtains a sum of absolute transformed differences of the obtained difference image, and calculates a motion vector based on the obtained sum of absolute transformed differences.

The quantization parameter determination unit determines the quantization parameter value based on the sum of absolute transformed differences for the current macroblock obtained by the motion estimate unit.

DESCRIPTION OF THE PREFERRED EMBODIMENTS

First Embodiment

A first embodiment will now be described with reference to the drawings.

1.1 Structure of Moving Image Coding Apparatus

Figure 1:
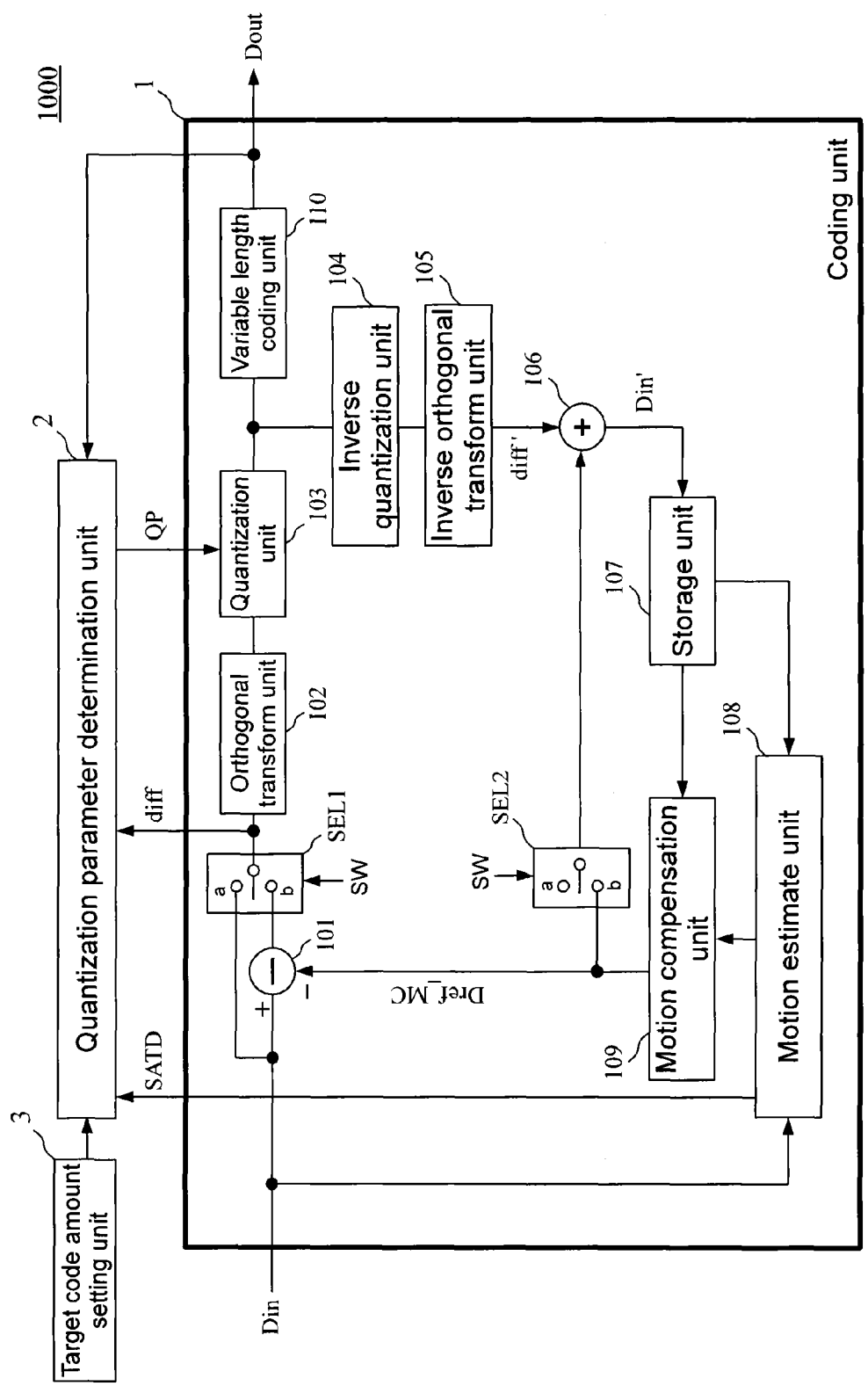
FIG. 1 schematically shows the structure of a moving image coding apparatus 1000 according to a first embodiment.

FIG. 1 schematically shows the structure of a moving image coding apparatus 1000 according to the first embodiment.

Figure 2:
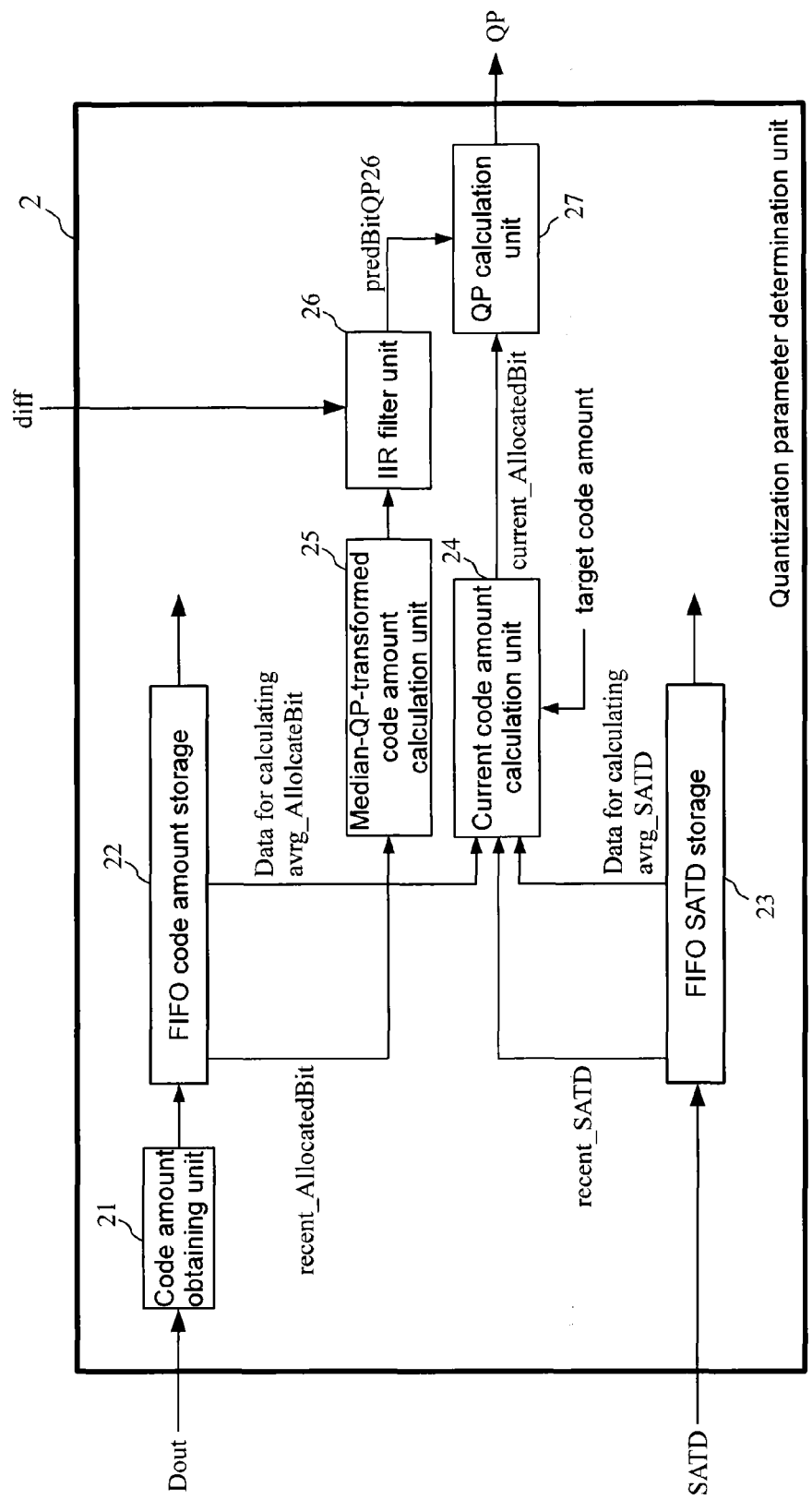
FIG. 2 schematically shows the structure of a quantization parameter determination unit 2 included in the moving image coding apparatus 1000 according to the first embodiment.

FIG. 2 schematically shows the structure of a quantization parameter determination unit 2 included in the moving image coding apparatus 1000 according to the first embodiment.

Figure 3:
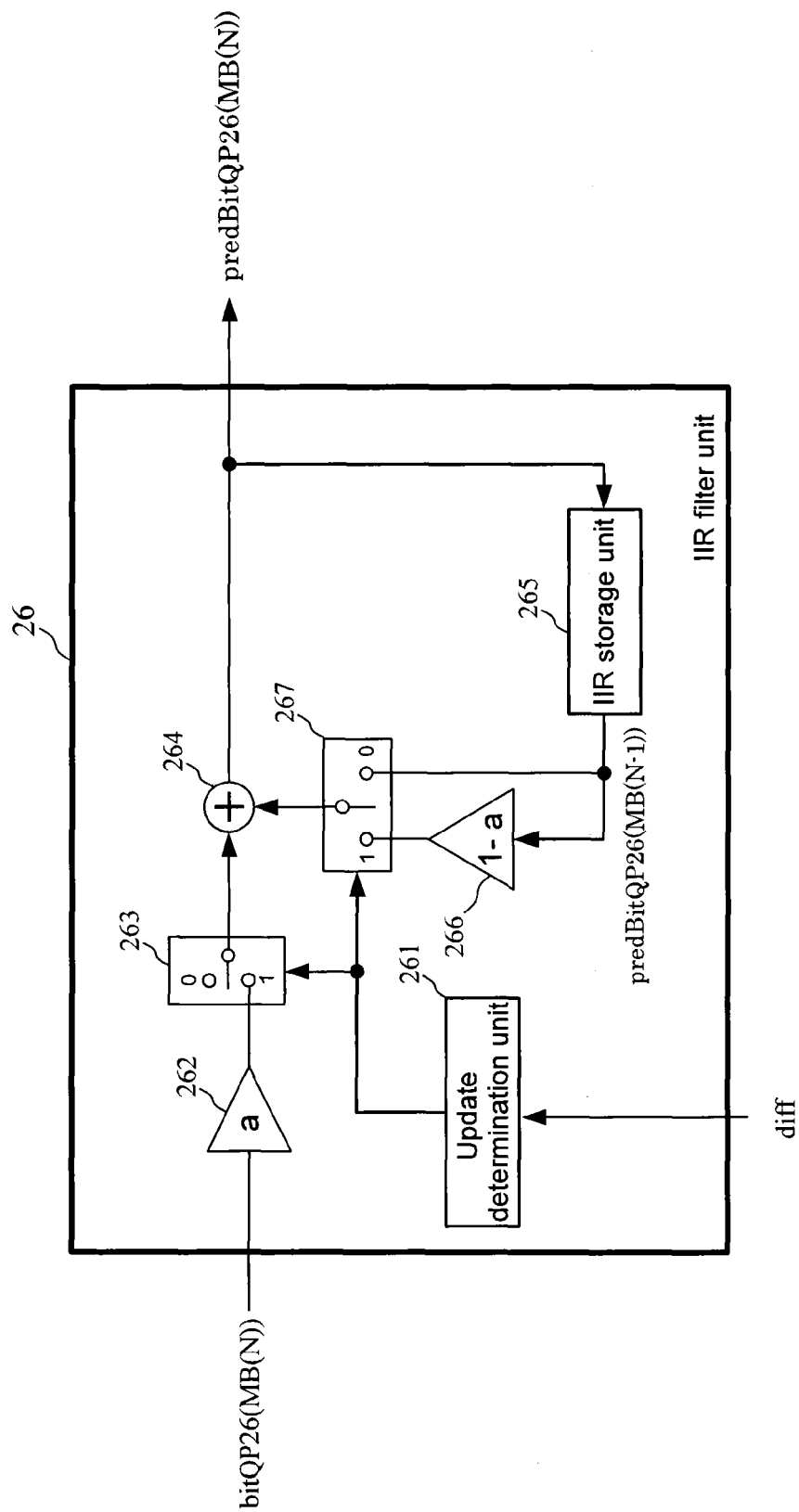
FIG. 3 schematically shows the structure of an IIR filter unit 26 included in the moving image coding apparatus 1000 according to the first embodiment.

FIG. 3 schematically shows the structure of an IIR filter unit 26 included in the moving image coding apparatus 1000 according to the first embodiment.

As shown in FIG. 1, the moving image coding apparatus 1000 includes a coding unit 1, which codes an input moving image signal Din, a quantization parameter determination unit 2, which determines a quantization parameter value used in quantization in the moving image coding performed by the coding unit 1, and a target code amount setting unit 3, which sets a target code amount.

As shown in FIG. 1, the coding unit 1 includes a subtracter 101, a selector SEL1, an orthogonal transform unit 102, a quantization unit 103, an inverse quantization unit 104, an inverse orthogonal transform unit 105, an adder 106, a storage unit 107, a motion estimate unit 108, a motion compensation unit 109, a selector SEL2, and a variable length coding unit 110.

The subtracter 101 receives an input moving image signal Din, and a motion-compensated moving image signal (or a signal resulting from motion compensation performed using a moving image signal of a reference frame, for example, a moving image signal of a one-frame previous frame) output from the motion compensation unit 109. The subtracter 101 then obtains a signal indicating a difference between the two input signals (prediction difference signal). For example, the subtracter 101 obtains a prediction error signal diff by using the formula:

$$\text{diff} = \text{Din} - \text{Dref\_MC},$$

where Din is a moving image signal of the current frame, Dref_MC is a motion-compensated moving image signal resulting from motion compensation of a moving image signal of a reference frame, and diff is a prediction error signal. The subtracter 101 outputs the obtained prediction error signal diff to the selector SEL1.

The selector SEL1 receives the moving image signal Din of the current frame, and the prediction error signal diff output from the subtracter 101. The selector SEL1 selects one of the moving image signal Din of the current frame and the prediction error signal diff in accordance with a control signal SW provided from the controller (not shown), and outputs the selected signal to the orthogonal transform unit 102 and the quantization parameter determination unit 2. More specifically, when the moving image signal of the current frame is coded by intra coding, the selector SEL1 outputs the moving image signal Din of the current frame, which has been input into its a-terminal, to the orthogonal transform unit 102. When the moving image signal of the current frame is coded by inter coding, the selector SEL1 outputs the prediction error signal diff, which has been input into its b-terminal, to the orthogonal transform unit 102.

The orthogonal transform unit 102 subjects the signal output from the selector SEL1 to orthogonal transform (for example, integer transform or discrete cosine transform (DCT)) in units of macroblocks. The orthogonal transform unit 102 outputs the signal resulting from the orthogonal transform to the quantization unit.

The quantization unit 103 receives the signal output from the orthogonal transform unit 102, and information about the value of the quantization parameter QP, which is output from the quantization parameter determination unit 2. Using the quantization parameter QP determined by the quantization parameter determination unit 2, the quantization unit 103 quantizes the signal resulting from orthogonal transform, which is output from the orthogonal transform unit 102. The quantization unit 103 outputs the quantized signal to the inverse quantization unit 104 and the variable length coding unit 110.

The inverse quantization unit 104 receives the signal quantized by the quantization unit 103. The inverse quantization unit 104 subjects the received signal to the processing inverse to the quantization performed by the quantization unit 103 (inverse quantization) to obtain a signal substantially identical to the signal input into the quantization unit 103. The inverse quantization unit 104 outputs the obtained signal to the inverse orthogonal transform unit 105.

The inverse orthogonal transform unit 105 receives the signal output from the inverse quantization unit 104. The inverse orthogonal transform unit 105 subjects the signal output from the inverse quantization unit 104 to the processing inverse to the orthogonal transform performed by the orthogonal transform unit 102 (inverse orthogonal transform) to obtain a signal substantially identical to the signal input into the orthogonal transform unit 102 (a prediction error signal diff' or a moving image signal Din'). The inverse orthogonal transform unit 105 outputs the obtained signal to the adder 106. The prediction error signal diff' is obtained by subjecting the prediction error signal diff to orthogonal transform, quantization, inverse quantization, and inverse orthogonal transform, and thus includes errors that can occur in orthogonal transform, quantization, and other processes. The moving image signal Din' is obtained by subjecting the input moving image signal Din to orthogonal transform, quantization, inverse quantization, and inverse orthogonal transform, and includes errors that can occur in orthogonal transform, quantization, and other processes.

The adder 106 receives the signal output from the inverse orthogonal transform unit 105 and the signal output from the selector SEL2, and adds the received signals together. For intra coding, the selector SEL2 selects the a-terminal, and outputs no signal. The adder 106 thus outputs the signal output from the inverse orthogonal transform unit 105 directly to the storage unit 107. For inter coding, the adder 106 adds the moving image signal Dref_MC output from the motion compensation unit 109, which is a motion-compensated moving image signal of the reference frame (the moving image signal of the reference frame resulting from motion compensation), and the signal output from the inverse orthogonal transform unit 105 (prediction error signal diff'), and outputs the resulting signal to the storage unit 107.

More specifically, the adder 106 outputs the moving image signal Din' to the storage unit 107 as (1) Din'=Din' for intra coding, and (2) Din'=diff'+Dref_MC for inter coding.

The storage unit 107 is a frame memory that can store, for example, moving image signals (data) corresponding to a plurality of frames. The storage unit 107 stores a moving image signal output from the adder 106. The storage unit 107 outputs a moving image signal Dref of a reference frame (e.g., a frame that is one-frame previous to the current frame) to the motion estimate unit 108 and the motion compensation unit 109.

The motion estimate unit 108 receives the moving image signal Din of the current frame, and the moving image signal Dref of the reference frame output from the storage unit 107. The motion estimate unit 108 searches for motions using the current frame image and the reference frame image, and determines, for example, a motion vector for each macroblock. When searching for motions, the motion estimate unit 108 specifically calculates the SATD (sum of absolute transformed differences) of a difference image indicating a difference between each macroblock of the current frame and its corresponding predetermined image region of the reference frame (the image region of the reference frame corresponding to the processing target macroblock shifted based on a motion vector), and determines the motion vector that can minimize the calculated SATD. The motion estimate unit 108 then outputs information about the determined motion vector and information about the reference frame to the motion compensation unit 109. The motion estimate unit 108 also outputs information about the SATD corresponding to the (optimum) motion vector to the quantization parameter determination unit 2.

The SATD is obtained by, for example, Hadamard transform. A difference image f (x,y) ($0 \leq x \leq n-1$ and $0 \leq y \leq n-1$, where n is a natural number) indicating a difference between each macroblock of the current frame and its corresponding predetermined image region of the reference frame (the image region of the reference frame corresponding to the processing target macroblock shifted based on a motion vector) undergoes a Hadamard matrix H, which is an n×n matrix, in both horizontal and vertical directions. More specifically, data F(u, v) resulting from Hadamard transform is obtained by using the formula:

$$F(u,v)=H \cdot f(x,y) \cdot H^T,$$

where $H^T$ is the transpose of the Hadamard matrix H. To obtain the SATD, the sum of absolute values of the components of the data F(u, v) is calculated.

The motion compensation unit 109 receives information about the motion vector and information about the reference frame, which are output from the motion estimate unit 108, and receives the moving image signal of the reference frame, which is output from the storage unit 107. To obtain a motion-compensated frame image, the motion compensation unit 109 shifts each image region of the reference frame image based on the corresponding motion vector determined by the motion estimate unit 108. The motion compensation unit 109 then generates a moving image signal that can form a motion-compensated frame image (a motion-compensated moving image signal) Dref_MC to the subtracter 101 and the selector SEL2.

The selector SEL2 receives the motion-compensated moving image signal Dref_MC, which is output from the motion compensation unit 109. For intra coding, the selector SEL2 selects the a-terminal (terminal with no input) shown in FIG. 1, and its output is input into the adder 106. In this case, no signal is input into the adder 106. For inter coding, the selector SEL2 selects the b-terminal, and outputs the motion-compensated moving image signal Dref_MC to the adder 106.

The variable length coding unit 110 receives the signal output from the quantization unit 103, and subjects the input signal (quantized signal) to variable length coding (entropy encoding, or for example Huffman coding or arithmetic coding). The variable length coding unit 110 then outputs the coded signal Dout.

As shown in FIG. 2, the quantization parameter determination unit 2 includes a code amount obtaining unit 21, a FIFO code amount storage 22, a FIFO SATD storage 23, a current code amount calculation unit 24, a median-QP-transformed code amount calculation unit 25, an IIR filter unit 26, and a QP calculation unit 27.

The code amount obtaining unit 21 receives a coded signal Dout, which is output from the variable length coding unit 110. The code amount obtaining unit 21 obtains the code amount of the current macroblock (processing target macroblock) from the coded signal Dout, and outputs the obtained code amount to the FIFO code amount storage 22. The code amount obtaining unit 21 may be incorporated in a video buffer (not shown), which is arranged subsequent to the variable length coding unit 110, or may be incorporated in the coding unit 1. In this case, the code amount obtaining unit 21 in the quantization parameter determination unit 2 can be eliminated.

The FIFO code amount storage 22 is a First In First Out (FIFO) memory. The FIFO code amount storage 22 stores data indicating a code amount, which is output from the code amount obtaining unit 21. The FIFO code amount storage 22 can store data indicating code amounts for N1 macroblocks (N1 is a natural number). The code amount for the most recent macroblock stored in the FIFO code amount storage 22 (in other words, the code amount for the macroblock input lastly into the FIFO code amount storage 22) is referred to as the code amount recent_AllocatedBit. The FIFO code amount storage 22 can read any data stored in the FIFO code amount storage 22 as required by other functional units (e.g., the current code amount calculation unit 24 or the median-QP-transformed code amount calculation unit).

The FIFO SATD storage 23 is a First In First Out (FIFO) memory. The FIFO SATD storage 23 stores information about the SATD output from the motion estimate unit 108. The FIFO SATD storage 23 can store SATDs for N1 macroblocks (N1 is a natural number). The SATD for the most recent macroblock stored in the FIFO SATD storage 23 (in other words, the SATD for the macroblock input lastly into the FIFO SATD storage 23) is referred to as the SATD recent_SATD. The FIFO SATD storage 23 may read any data stored in the FIFO SATD storage 23 as required by other functional units (e.g., the current code amount calculation unit 24).

The current code amount calculation unit 24 reads, from the FIFO code amount storage 22, code amounts for k1 macroblocks (k1 is a natural number, and k1≤N1) including the code amount recent_AllocatedBit for the most recent macroblock. Among the data stored in the FIFO code amount storage 22, the code amounts for k1 macroblocks (or pieces of data indicating the code amounts) are successive pieces of data for k1 macroblocks in order from the most recent data toward previous data (in time series). The current code amount calculation unit 24 also reads the code amount recent_SATD for the most recent macroblock and SATDs for the previous k1 macroblocks (k1 is a natural number, and k1≤N1) from the FIFO SATD storage 23. Among the data stored in the FIFO SATD storage 23, the SATDs for k1 macroblocks (pieces of data indicating the SATDs) are successive pieces of data in order from the data for the macroblock that is one-macroblock previous to the current macroblock toward previous data (in time series).

The current code amount calculation unit 24 receives a target code amount that is set by the target code amount setting unit 3. The current code amount calculation unit 24 calculates a code amount current_AllocatedBit, which is a code amount to be allocated to the current macroblock (processing target macroblock) (described in detail later), based on the target code amount, the code amounts for a plurality of macroblocks read from the FIFO code amount storage 22, the code amount recent_SATD for the most recent macroblock, and a plurality of SATDs read from the FIFO SATD storage 23. The current code amount calculation unit 24 then outputs the calculated code amount current_AllocatedBit, which is to be allocated to the current macroblock (processing target macroblock), to the QP calculation unit 27.

The median-QP-transformed code amount calculation unit 25 reads the code amount recent_AllocatedBit for the most recent macroblock from the FIFO code amount storage 22, and calculates a median-QP-transformed code amount, which is a code amount obtained by quantizing the read code amount recent_AllocatedBit using the median of QP values (substantially the median in the range of possible QP values). The median-QP-transformed code amount calculation unit 25 then outputs the calculated median-QP-transformed code amount to the IIR filter unit 26.

As shown in FIG. 3, the IIR filter unit 26 includes an update determination unit 261, a first gain adjustment unit 262, a selector 263, an adder 264, an IIR storage unit 265, a second gain adjustment unit 266, and a selector 267.

The update determination unit 261 receives an output from the selector SEL1 The update determination unit 261 sets an update determination flag to 0 when the moving image coding apparatus 1000 performs inter coding and the prediction error signal diff output from the selector SEL1 indicates 0, or more specifically when the prediction error signal diff for the current macroblock indicates 0 (when the prediction error component value of each pixel of the current macroblock is 0). In any cases other than the above-described case, the update determination unit 261 sets the update determination flag to 1. The update determination unit 261 outputs the update determination flag to the selector 263 and the selector 267.

The first gain adjustment unit 262 subjects the median-QP-transformed code amount bitQP26, which is output from the median-QP-transformed code amount calculation unit 25, to multiplication using a coefficient a (0≤a≤1), and outputs the resulting code amount to the selector 263.

The selector 263 outputs the code amount output from the first gain adjustment unit 262 to the adder 264 when the update determination flag input from the update determination unit 261 is set at 1. The selector 263 outputs no signal to the adder 264 when the update determination flag input from the update determination unit 261 is set at 0.

The adder 264 receives an output from the selector 263 and an output from the selector 267, adds the received outputs together, and outputs the sum to the QP calculation unit 27 as a median-QP-transformed code amount predBitQP26.

The IIR storage unit 265 receives the median-QP-transformed code amount predBitQP26, which is output from the adder 264, and delays the signal by the time corresponding to one macroblock, and outputs the delayed signal to the second gain adjustment unit 266 and the selector 267.

The second gain adjustment unit 266 subjects the output from the IIR storage unit 265 to multiplication using a coefficient 1−a (0≤a≤1), and outputs the resulting code amount to the selector 267.

The selector 267 outputs the code amount output from the second gain adjustment unit 266 to the adder 264 when the update determination flag input from the update determination unit 261 is set at 1. The selector 267 outputs the code amount output from the IIR storage unit 265 to the adder 264 when the update determination flag input from the update determination unit 261 is set at 0.

The QP calculation unit 27 receives the median-QP-transformed code amount predBitQP26, which is output from the adder 264 of the IIR filter unit 26, and the code amount current_AllocatedBit to be allocated to the current macroblock, which is output from the current code amount calculation unit 24. Based on the median-QP-transformed code amount predBitQP26 and the code amount current_AllocatedBit to be allocated to the current macroblock, the QP calculation unit 27 calculates the quantization parameter QP used in quantization of the current macroblock. The QP calculation unit 27 then outputs the calculated quantization parameter QP to the quantization unit 103.

The target code amount setting unit 3 sets the target code amount by designating the number of macroblocks. For example, the target code amount setting unit 3 sets the target code amount as the code amount to be allocated to k1×2 macroblocks. The target code amount may be set via an external interface, or may be preset in the apparatus.

1.2 Operation of Moving Image Coding Apparatus

The operation of the moving image coding apparatus 1000 with the above structure will now be described.

Figure 4B:
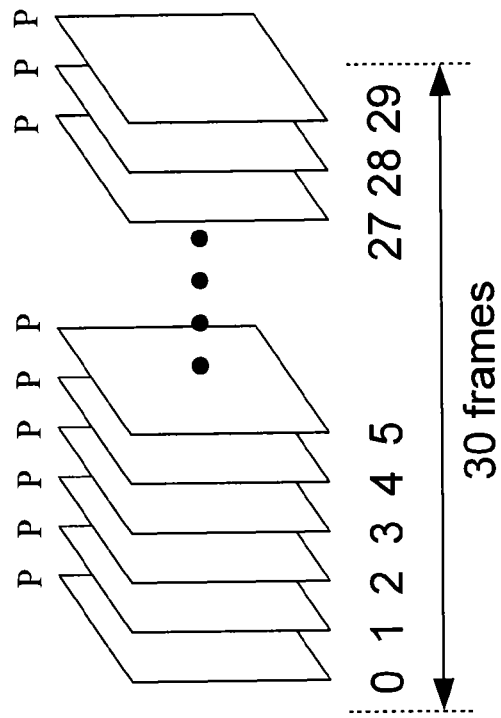
FIGS. 4A and 4B show an example of a moving image signal Din that is input into the moving image coding apparatus 1000.
Figure 4A:
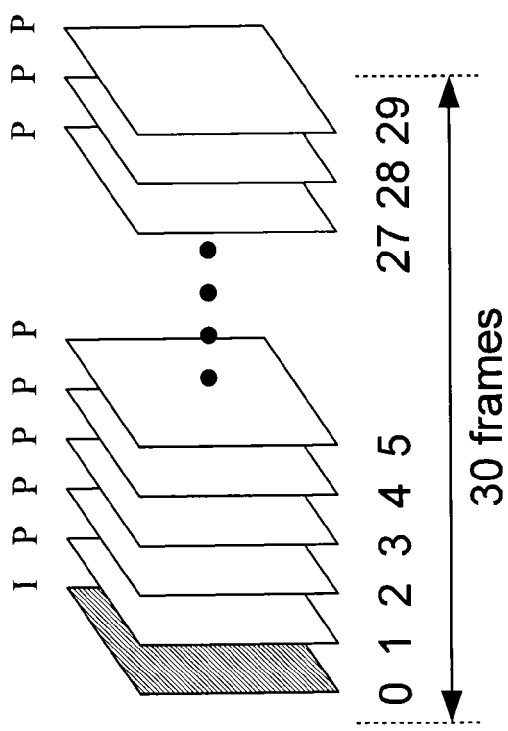

FIGS. 4A and 4B show an example of the moving image signal Din input into the moving image coding apparatus 1000. The moving image signal Din shown in FIGS. 4A and 4B has a frame rate of 30 fps. For constant bit rate (CBR) control, the moving image signal Din may be, for example, a moving image signal that does not use B pictures. More specifically, the moving image signal Din includes an I picture only as its first frame (picture), and includes P pictures as all the frames (pictures) following the first frame. In other words, the moving image signal Din has the picture structure shown in FIG. 4A only for the first 30 frames, and has the picture structure shown in FIG. 4B for subsequent frames in units of 30 frames. The pictures corresponding to a unit time are numbered in chronological order (the unit time is 1 second in the example of FIGS. 4A and 4B, and the number of frames (pictures) per unit time is 30). Among the first 30 frames, only the picture with picture number 0 is an I picture, and the pictures with picture numbers 1 to 29 are P pictures. Subsequent pictures, which are numbered 0 to 29 (all pictures) in units of 30 frames, are all P pictures.

Hereafter, the moving image signal Din has a frame rate of 30 fps, and includes an I picture only as the first frame and P pictures as all the subsequent frames. The moving image coding apparatus 1000 may subject predetermined macroblocks of P-pictures included in the moving image signal Din to intra coding (intra coding in units of macroblocks).

The moving image signal Din is input into the subtracter 101, the selector SEL1, and the motion estimate unit 108 in the coding unit 1.

When the current macroblock (processing target macroblock) is coded by intra coding, the selector SEL1 selects the a-terminal shown in FIG. 1 in accordance with the control signal SW, and the moving image signal Din is input into the orthogonal transform unit 102. When the current macroblock is coded by inter coding, the selector SEL1 selects the b-terminal shown in FIG. 1 in accordance with the control signal SW. In this case, the subtracter 101 subtracts the motion-compensated moving image signal Dref_MC, which is output from the motion compensation unit 109, from the moving image signal Din to obtain the prediction error signal diff. In other words, the subtracter 101 performs the processing corresponding to the formula:

diff=Din−Dref_MC.

The orthogonal transform unit 102 subjects the moving image signal Din or the prediction error signal diff, which is output from the selector SEL1, to orthogonal transform (for example, integer transform or DCT). The signal resulting from the orthogonal transform is output to the quantization unit 103.

The quantization unit 103 quantizes the signal resulting from the orthogonal transform using the quantization parameter QP output from the quantization parameter determination unit 2.

The signal quantized by the quantization unit 103 then undergoes variable length coding (for example, Huffman coding or arithmetic coding), which is performed by the variable length coding unit 110. The resulting signal is then output from the coding unit 1 as a coded signal Dout.

The signal quantized by the quantization unit 103 is inversely quantized by the inverse quantization unit 104, and is further subjected to inverse orthogonal transform performed by the inverse orthogonal transform unit 105.

The signal resulting from the inverse orthogonal transform is input into the adder 106, and is subjected to the processing described below by the adder 106. The adder 106 outputs the moving image signal Din' to the storage unit 107 as (1) Din'=Din' for intra coding, and
(2) Din'=diff'+Dref_MC for inter coding.

The storage unit 107 stores the moving image signal Din' output from the adder 106.

The motion estimate unit 108 searches for motions using the current frame image, and the reference frame image read from the storage unit 107, and may determine a motion vector for each macroblock. When searching for motions, the motion estimate unit 108 calculates the SATD (sum of absolute transformed differences) of a difference image indicating a difference between each macroblock of the current frame and its corresponding predetermined image region of the reference frame (the image region of the reference frame image corresponding to the processing target macroblock shifted based on a motion vector), and determines the motion vector that can minimize the calculated SATD. The motion estimate unit 108 then outputs information about the determined motion vector and information about the reference frame to the motion compensation unit 109. The motion estimate unit 108 also outputs information about the SATD corresponding to the (optimum) motion vector to the quantization parameter determination unit 2.

The motion compensation unit 109 shifts each image region of the reference frame based on the motion vector determined by the motion estimate unit 108 to obtain a motion-compensated frame image. The moving image signal obtained by the motion compensation unit 109, that is, the moving image signal that can form the motion-compensated frame image (the motion-compensated moving image signal) Dref_MC, is output to the subtracter 101 and the selector SEL2.

1.2.1 Operation of Quantization Parameter Determination Unit

The operation of the quantization parameter determination unit 2 will now be described.

The coded signal Dout output from the variable length coding unit 110 is input into the code amount obtaining unit 21 of the quantization parameter determination unit 2.

The code amount obtaining unit 21 obtains the code amount for each macroblock from the coded signal Dout. The obtained code amount is then input into the FIFO code amount storage 22.

The FIFO code amount storage 22 stores the code amount for each macroblock (data about the code amount). More specifically, the FIFO code amount storage 22 stores code amounts for N1 macroblocks. The code amount input lastly into the FIFO code amount storage 22, that is, the code amount for the most recent macroblock, is referred to as the code amount recent_AllocatedBit. Every time when the code amount for the most recent macroblock is input into the FIFO code amount storage 22, the code amount (data about the code amount) for the oldest macroblock is removed (deleted) from the FIFO code amount storage 22. More specifically, the FIFO code amount storage 22 stores code amounts for N1 macroblocks (data about the code amounts) with a queue memory technique (FIFO memory technique).

The motion estimate unit 108 outputs the obtained SATD of the current macroblock, which is input into the FIFO SATD storage 23 of the quantization parameter determination unit 2.

The FIFO SATD storage 23 stores SATDs for macroblocks. More specifically, the FIFO SATD storage 23 stores SATDs for N1 macroblocks. The SATD input lastly into the FIFO SATD storage 23, that is, the SATD for the most recent macroblock, is referred to as the SATD recent_SATD. Every time when the SATD for the most recent macroblock is input into the FIFO SATD storage 23, the SATD (data about the SATD) for the oldest macroblock is removed (deleted) from the FIFO SATD storage 23. More specifically, the FIFO SATD storage 23 stores SATDs for N2 macroblocks (data about the SATDs) with a queue memory technique (FIFO memory technique).

The current code amount calculation unit 24 reads code amounts (data about the code amounts) for k1 macroblocks (k1 is a natural number) including the code amount recent_AllocatedBit for the most recent macroblock from the FIFO code amount storage 22. The current code amount calculation unit 24 reads SATDs for k1 macroblocks (k1 is a natural number) including the SATD recent_SATD for the most recent macroblock from the FIFO SATD storage 23.

The target code amount setting unit 3 sets a target code amount, which is an ideal code amount for k1×2 macroblocks (a code amount to be allocated to k1×2 macroblocks).

The current code amount calculation unit 24 calculates the code amount current_AllocatedBit to be allocated to the current macroblock (processing target macroblock) based on the target code amount, the code amounts for k1 macroblocks read from the FIFO code amount storage 22, the code amount recent_SATD for the most recent macroblock, and the k1 SATDs read from the FIFO SATD storage 23. More specifically, the current code amount calculation unit 24 calculates the code amount current_AllocatedBit through processes (1) to (3) described below.

(1) Calculating the Average SATD

The current code amount calculation unit 24 calculates the average of the k1 SATDs read from the FIFO SATD storage 23 to obtain the average SATD avrg_SATD.

(2) Calculating the Average Code Amount to be Allocated

The current code amount calculation unit 24 calculates a total code amount usedBit for k1 macroblocks read from the FIFO code amount storage 22, and calculates the code amount allocatedBit to be allocated to subsequent k1 macroblocks by using the formula:

allocatedBit=targetBit−usedBit, where targetBit is the target code amount (code amount to be allocated to 2×k1 macroblocks), and usedBit is the code amount allocated to the k1 previous macroblocks. The current code amount calculation unit 24 obtains the code amount allocatedBit to be allocated to the k1 subsequent macroblocks including the current macroblock.

The current code amount calculation unit 24 then calculates the average avrg_AllocatedBit of the code amounts for the k1 subsequent macroblocks by using the formula:

avrg_AllocatedBit=allocatedBit/k1

(3) Calculating the Code Amount to be Allocated to the Current Macroblock

The current code amount calculation unit 24 calculates the code amount to be allocated to the current macroblock by using the formula:

current_AllocatedBit=avrg_AllocatedBit+coex(recent_SATD−avrg_SATD), where recent_SATD is the SATD for the most recent macroblock stored in the FIFO SATD storage 23, and coe is a coefficient. The SATD recent_SATD is the SATD for the current macroblock calculated by the motion estimate unit 108. The difference between the SATD recent_SATD and the average avrg_SATD of the SATDs for the k1 previous macroblocks including the current macroblock (recent_SATD−avrg_SATD) correlates with changes in the code amount to be allocated to the current macroblock. Thus, determining (estimating) the code amount to be allocated to the current macroblock based on the difference (recent_SATD−avrg_SATD) allows the calculated code amount to approach the code amount that is actually allocated to the current macroblock. The coefficient coe is used to adjust the SATD and the code amount. When the SATD and the code amount are at a ratio of 1:1, the coefficient coe is set at 1. In this case, the multiplication using the coefficient coe can be eliminated.

When the FIFO code amount storage 22 and the FIFO SATD storage 23 store less than k1 pieces of data, the average avrg_AllocatedBit, the average avrg_SATD, and the like may be set to predetermined values (e.g., the average of the stored pieces of data, an approximate value of the average, or an estimated value of the average).

As described above, the code amount current_AllocatedBit to be allocated to the current macroblock, which is calculated by the current code amount calculation unit 24, is output to the QP calculation unit 27.

The median-QP-transformed code amount calculation unit 25 reads the code amount recent_AllocatedBit for the most recent macroblock stored in the FIFO code amount storage 22 (the macroblock previous to the current macroblock by one macroblock) from the FIFO code amount storage 22. The median-QP-transformed code amount calculation unit 25 calculates the code amount bitQP26 by quantizing the code amount recent_AllocatedBit for the most recent macroblock (macroblock previous to the current macroblock by one macroblock) using the median of QP values (substantially the median in the range of possible QP values). More specifically, the median-QP-transformed code amount calculation unit 25 calculates the transformed code amount bitQP26 by quantizing the code amount recent_AllocatedBit for the most recent macroblock (macroblock previous to the current macroblock by one macroblock) using the median of the QP values by using the formula:

bit$QP26$=recent_AllocatedBit/$2^{((C0-\text{recent\_AllocatedBit})/6)}$, where C0 is the median of QP values.

The median C0 may be set to, for example, 26 when the QP values are in the range of 0 to 51. In the above formula, an increase of 6 in the quantization parameter value doubles the code amount.

As described above, the code amount bitQP26 transformed using the median of QP values for the most recent macroblock (macroblock previous to the current macroblock by one macroblock), which is calculated by the median-QP-transformed code amount calculation unit 25, is output to the IIR filter unit 26.

In the IIR filter unit 26, the update determination unit 261 determines whether the prediction error signal diff for the current macroblock indicates 0. When the prediction error signal diff for the current macroblock indicates 0 (when the prediction error component value of each pixel of the current macroblock is 0), the update determination flag is set to 0. In any cases other than the above-described case, the update determination unit 261 sets the update determination flag to 1.

The IIR filter unit 26 performs the processing described below.

(1) When the Update Determination Flag is Set at 1

The IIR filter unit 26 calculates the median-QP-transformed code amount predBitQP26 processed through infinite impulse response (IIR) filtering by using the formula:

pred$BitQP26(MB(N))$=$(1-a)$×pred$BitQP26(MB(N-1))$+$a$×bit$QP(MB(N))$, where predBitQP26(MB(N)) is the code amount transformed using the median of QP values for the Nth macroblock (data input into the IIR filter unit 26) and processed through filtering,
predBitQP26(MB(N−1)) is the code amount transformed using the median of QP values of the (N−1)th macroblock (macroblock previous to the Nth macroblock by one macroblock) and processed through filtering, and
a is the internal division ratio ($0 \le a \le 1$).

The proportionality coefficient a is, for example, 1/32. In this case, the code amount bitQP (MB(N)) and the code amount predBitQP26 (MB (N−1)) (data for the macroblock that is one-macroblock previous to the macroblock associated with the input data) are weighted at a ratio of 1:31. The IIR filter unit 26 weights the previous data with a larger weight to cause the median-QP-transformed code amount predBitQP26 processed through IIR filtering to change gradually. If the QP value changes drastically, the image quality of the coded moving image may change drastically. To prevent such drastic changes in the image quality, the IIR filter unit 26 prevents the median-QP-transformed code amount predBitQP26 processed through IIR filtering from changing drastically.

(2) When the Update Determination Flag is Set at 0

The IIR filter unit 26 calculates the code amount by using the formula:

$$\text{predBit}QP26(MB(N)) = \text{predBit}QP26(MB(N-1)).$$

When the prediction error signal indicates 0, using the currently set QP value can enable appropriate coding. In this case, the IIR filter unit 26 performs no update process.

The above processing yields the median-QP-transformed code amount predBitQP26 processed through IIR filtering by the IIR filter unit 26. The resulting code amount is then output to the QP calculation unit 27.

The QP calculation unit 27 calculates the quantization parameter (QP) to be used in quantization of the current macroblock based on the median-QP-transformed code amount predBitQP26 and the code amount current_AllocatedBit to be allocated to the current macroblock. More specifically, the QP calculation unit 27 calculates the quantization parameter QP by using the formula:

$$QP = C0 - 6 \times \log 2(\text{current\_AllocatedBit}/\text{predBit}QP26),$$

where C0 is the median of QP values (the median is set to, for example, 26 when the QP values are in the range of 0 to 51), and log 2(x) is a function that calculates a logarithm to the base 2.

In the above formula, an increase of 6 in the quantization parameter value doubles the code amount. The QP calculation unit 27 may modify the above formula into the following formula:

$$QP = C0 - 6 \times (\log 2(\text{current\_AllocatedBit}) - \text{Log } 2(\text{pred-Bit}QP26)),$$

and may determine the quantization parameter QP through the processing corresponding to the modified formula.

The processing corresponding to the function log 2(x) that calculates the logarithm may alternatively be performed by, for example, using a lookup table (LUT).

As described above, the QP calculation unit 27 calculates the ratio between the median-QP-transformed code amount predBitQP26 for the macroblock that is one-macroblock previous to the current macroblock (data processed through IIR filtering) and the code amount current_AllocatedBit to be allocated to the current macroblock calculated based on the SATD that correlates strongly with the code amount. Based on the calculated ratio, the QP calculation unit 27 determines the quantization parameter QP to be used in quantization of data for the current macroblock by using the formula above.

The determined quantization parameter QP is then output to the quantization unit 103. The quantization unit 103 performs quantization of the current macroblock using the determined quantization parameter QP.

As described above, the moving image coding apparatus 1000 sets the target code amount (e.g., the code amount to be allocated to 2×k1 macroblocks) targetBit for every predetermined number of macroblocks, and calculates the code amount current_AllocatedBit to be allocated to the current macroblock based on the code amount allocated to the k1 previous macroblocks and changes in the SATD that correlates strongly with the code amount to be generated by using the formulas:

$$\text{allocatedBit} = \text{targetBit} - \text{usedBit}$$

$$\text{avrg\_AllocatedBit} = \text{allocatedBit}/k1$$

$$\text{current\_AllocatedBit} = \text{avrg\_AllocatedBit} + \text{coex}(\text{recent\_SATD} - \text{avrg\_SATD})$$

The moving image coding apparatus 1000 further determines the quantization parameter QP used in quantization of the current macroblock in accordance with the ratio (relationship) between the median-QP-transformed code amount (the transformed code amount processed through IIR filtering) predBitQP26, which is obtained by transforming the code amount allocated to the macroblock that is one-macroblock previous to the current macroblock by using the median of QP values, and the code amount current_AllocatedBit to be allocated to the current code amount. The moving image coding apparatus 1000 determines the quantization parameter QP by using the formula:

$$QP = C0 - 6 \times \log 2(\text{current\_AllocatedBit}/\text{predBit}QP26),$$

where C0 is the median of QP values (the median is set to, for example, 26 when the QP values are in the range of 0 to 51).

The moving image coding apparatus 1000 determines (estimates) the code amount current_AllocatedBit to be allocated to the current macroblock using the SATD that correlates strongly with the code amount to be generated, and thus reduces errors (differences) between the code amount actually used (generated) for the current macroblock and the code amount current_AllocatedBit allocated to the current macroblock. The moving image coding apparatus 1000 determines the quantization parameter QP used in quantization of the current macroblock in accordance with the code amount current_AllocatedBit allocated to the current code amount, which is highly predictable, and the ratio (relationship) between the median-QP-transformed code amount (the transformed code amount processed through IIR filtering) predBitQP26, which is obtained by transforming the code amount allocated to the macroblock that is one-macroblock previous to the current macroblock by using the median of QP values, and the code amount current_AllocatedBit to be allocated to the current macroblock. As a result, the moving image coding apparatus 1000 calculates the quantization parameter QP with high precision. The code amount to be generated for each signal coded by the moving image coding apparatus 1000 approaches its target code amount. The moving image coding apparatus 1000 can thus control the code amount using a constant bit rate (CBR) easily and with high precision.

Also, the moving image coding apparatus 1000 sets the target code amount by designating the number of macroblocks. This enables the moving image coding apparatus 1000 to control the code amount appropriately in units shorter than frames.

Second Embodiment

A second embodiment will now be described.

In the present embodiment, the components that are the same as those described in the above embodiment will be given the same reference numerals as those components and will not be described in detail.

2.1 Structure of Moving Image Coding Apparatus

Figure 5:
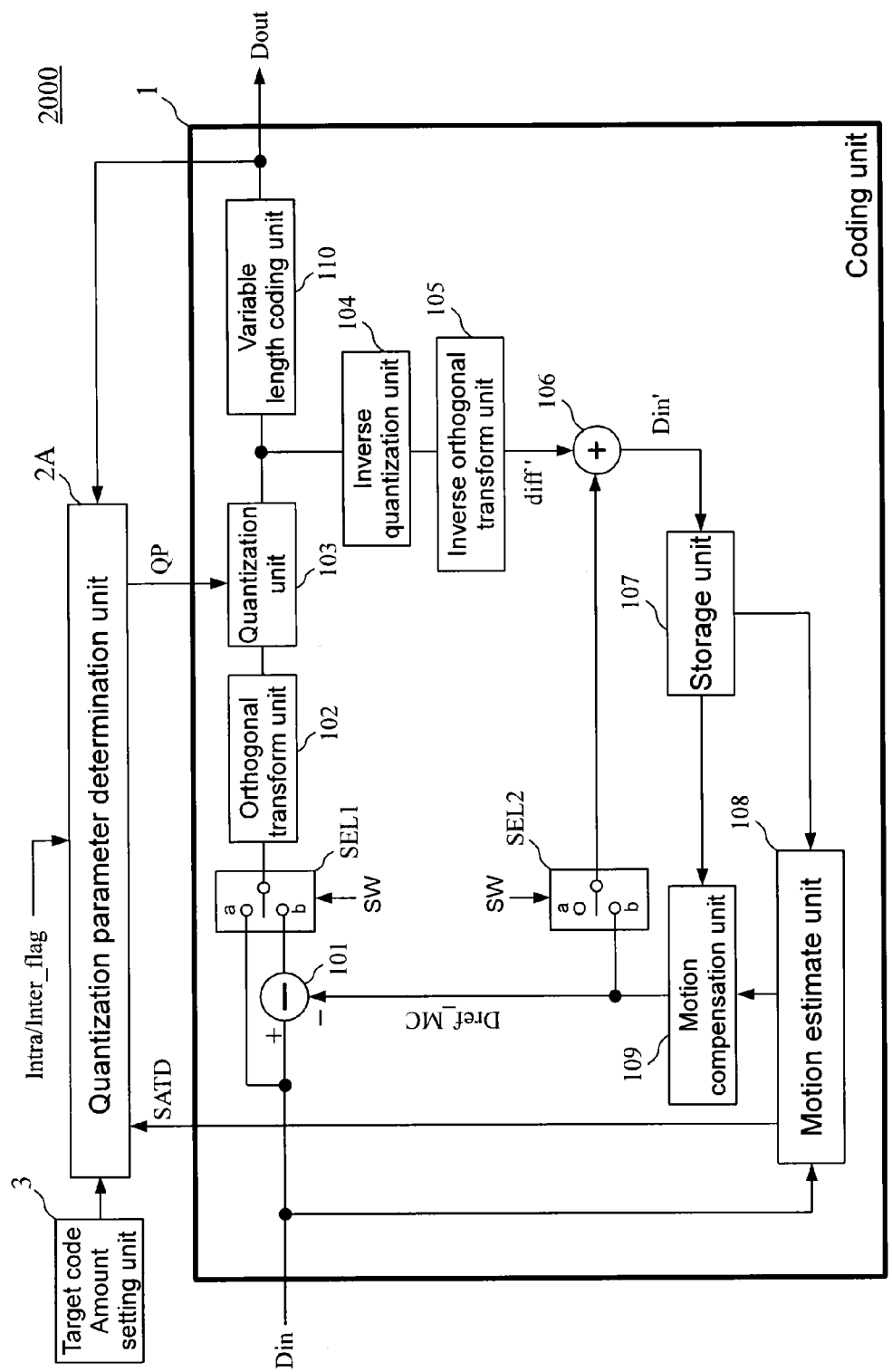
FIG. 5 schematically shows the structure of a moving image coding apparatus 2000 according to a second embodiment.

FIG. 5 schematically shows the structure of a moving image coding apparatus 2000 according to the second embodiment.

Figure 6:
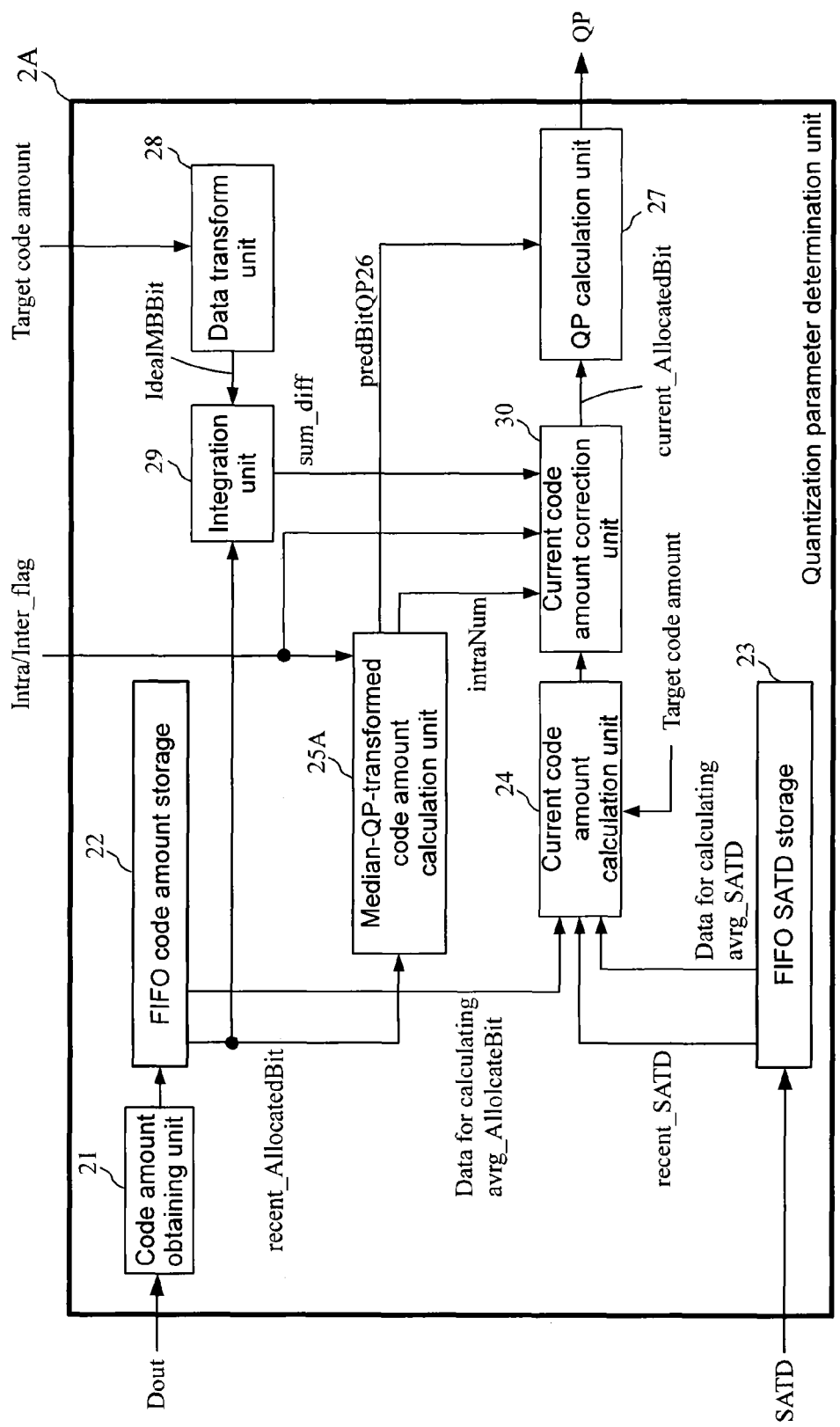
FIG. 6 schematically shows the structure of a quantization parameter determination unit 2A included in the moving image coding apparatus 2000 according to the second embodiment.

FIG. 6 schematically shows the structure of a quantization parameter determination unit 2A included in the moving image coding apparatus 2000 according to the second embodiment.

Figure 7:
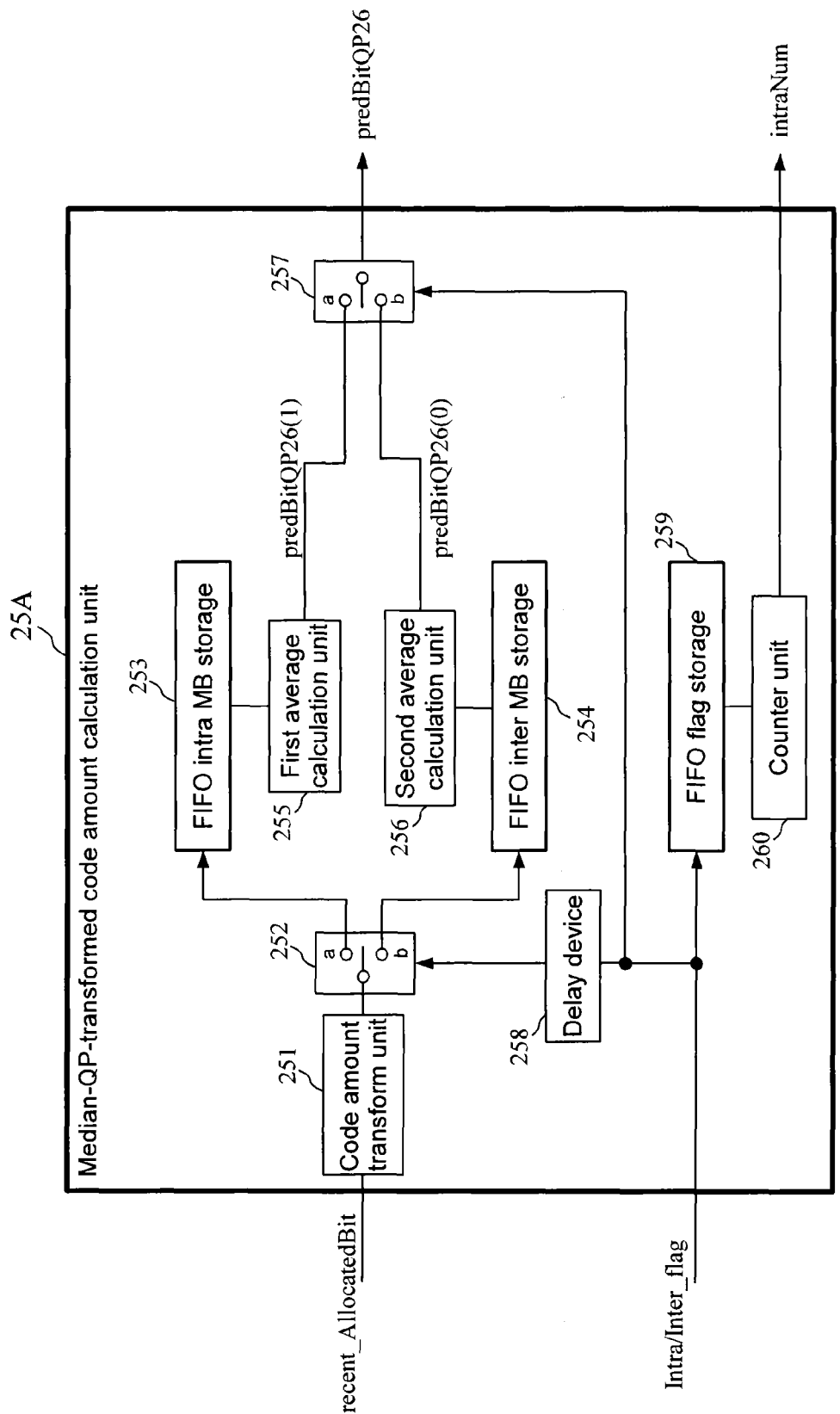
FIG. 7 schematically shows the structure of a median-QP-transformed code amount calculation unit 25A included in the moving image coding apparatus 1000 according to the second embodiment.

FIG. 7 schematically shows the structure of a median-QP-transformed code amount calculation unit 25A included in the moving image coding apparatus 1000 according to the second embodiment.

Figure 8:
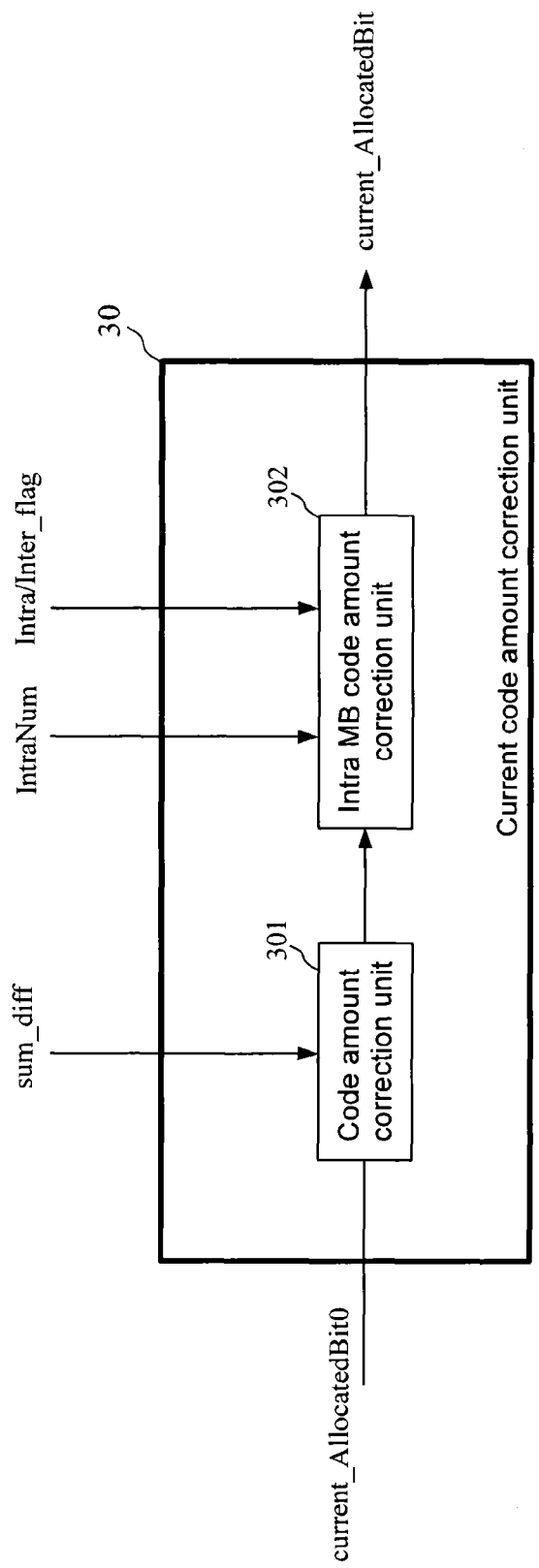
FIG. 8 schematically shows the structure of a current code amount correction unit 30 included in the moving image coding apparatus 1000 according to the second embodiment.

FIG. 8 schematically shows the structure of a current code amount correction unit 30 included in the moving image coding apparatus 1000 according to the second embodiment.

The moving image coding apparatus 2000 of the present embodiment includes the quantization parameter determination unit 2A replacing the quantization parameter determination unit 2 of the moving image coding apparatus 1000 of the first embodiment.

As shown in FIG. 6, the quantization parameter determination unit 2A differs from the quantization parameter determination unit 2 of the second embodiment in that it includes the median-QP-transformed code amount calculation unit 25A in place of the median-QP-transformed code amount calculation unit 25, eliminates the IIR filter unit 26, and additionally includes a data transform unit 28, an integration unit 29, and the current code amount correction unit 30.

As shown in FIG. 7, the median-QP-transformed code amount calculation unit 25A receives the code amount recent_AllocatedBit of the most recent macroblock, and a flag Intra/Inter_flag indicating whether a current macroblock (a processing target macroblock) is an intra macroblock or an inter macroblock. The flag Intra/Inter_flag may be obtained by a controller (not shown) that controls the moving image coding apparatus 2000, and may be input into the quantization parameter determination unit 2A. Alternatively, the flag Intra/Inter_flag may be obtained by the coding unit 1, and may be input into the quantization parameter determination unit 2A.

The median-QP-transformed code amount calculation unit 25A switches a median-QP-transformed code amount predBitQP26(1) for an intra macroblock and a median-QP-transformed code amount predBitQP26(0) for an inter macroblock based on the flag Intra/Inter_flag, and outputs the code amount as a median-QP-transformed code amount predBitQP26 to the QP calculation unit 27.

The median-QP-transformed code amount calculation unit 25A stores the flag Intra/Inter_flag, and outputs the number of intra macroblocks occurring in a predetermined period as an intra macroblock number intraNum to the current code amount correction unit 30.

As shown in FIG. 7, the median-QP-transformed code amount calculation unit 25A includes a code amount transform unit 251, a selector 252, and a FIFO intra MB storage 253, a FIFO inter MB storage 254, a first average calculation unit 255, a second average calculation unit 256, a selector 257, and a delay device 258. As shown in FIG. 7, the median-QP-transformed code amount calculation unit 25A includes a FIFO flag storage 259 and a counter unit 260.

The code amount transform unit 251 obtains a code amount recent_AllocatedBit of a macroblock that is one-macroblock previous to the current macroblock from the FIFO code amount storage, and calculates a median-QP-transformed code amount by quantizing the obtained code amount recent_AllocatedBit using the median in the range of possible QP values in the quantization performed by the coding unit 1. The code amount transform unit 251 outputs the calculated median-QP-transformed code amount to the selector 252.

The selector 252 receives an output from the code amount transform unit 251.

(1) When the input flag Intra/Inter_flag has a value indicating an intra macroblock or in other words when the macroblock that is one-macroblock previous to the current macroblock is an intra macroblock, the selector 252 outputs an output from the code amount transform unit 251 to the FIFO intra MB storage 253.

(2) When the input flag Intra/Inter_flag has a value indicating an inter macroblock or in other words when the macroblock that is one-macroblock previous to the current macroblock is an inter macroblock, the selector 252 outputs an output from the code amount transform unit 251 to the FIFO inter MB storage 254.

The FIFO intra MB storage 253 is a FIFO (first-in first-out) memory, and can store transformed code amounts for N3 macroblocks (N3 is a natural number). The FIFO intra MB storage 253 stores the median-QP-transformed code amount obtained by the code amount transform unit 251, which is output from the selector 252, when the macroblock that is one-macroblock previous to the current macroblock is an intra macroblock. It is preferable that the initial values for the N3 data of the FIFO intra MB storage 253 are set based on, for example, the size of an input image or the size of a picture.

The FIFO inter MB storage 254 is a FIFO (first-in first-out) memory, and is capable of storing code amounts for N4 macroblocks (N4 is a natural number). The FIFO inter MB storage 254 stores the median-QP-transformed code amount obtained by the code amount transform unit 251, which is output from the selector 252 when the macroblock that is one-macroblock previous to the current macroblock is an intra macroblock. It is preferable that the initial values for the N3 data of the FIFO intra MB storage 253 are set based on, for example, the size of an input image or the size of a picture. The value of N4 may be identical to the value of N3.

The first average calculation unit 255 calculates the average of the N3 median-QP-transformed code amounts stored in the FIFO intra MB storage 253, and outputs the calculated average to the selector 257 as predBitQP26(1).

The second average calculation unit 256 calculates the average of the N4 median-QP-transformed code amounts stored in the FIFO inter MB storage 254, and outputs the calculated average to the selector 257 as predBitQP26(0).

The selector 257 receives an output from the first average calculation unit 255 and an output from the second average calculation unit 256. The selector 257 also receives a flag Intra/Inter_flag.

(1) When the input flag Intra/Inter_flag has a value indicating an intra macroblock or in other words when the current macroblock is an intra macroblock, the selector 257 outputs an output predBitQP26(1) from the first average calculation unit 255 to the QP calculation unit 27 as predBitQP26. (2) When the input flag Intra/Inter_flag has a value indicating an inter macroblock or in other words when the current macroblock is an inter macroblock, the selector 257 outputs an output predBitQP26(0) from the second average calculation unit 256 to the QP calculation unit 27 as predBitQP26.

The delay device 258 receives a flag Intra/Inter_flag for the current macroblock, and delays the input flag Intra/Inter_flag by the time corresponding to one macroblock and outputs the flag to the selector 252. More specifically, the flag Intra/Inter_flag output from the delay device 258 indicates whether the macroblock that is one-macroblock previous to the current macroblock is an intra macroblock or an inter macroblock. The delay device 258 may be eliminated, and the flag Intra/Inter_flag for the macroblock that is one-macroblock previous to the current macroblock may be obtained from the FIFO flag storage 259, and the obtained flag Intra/Inter_flag may be input into the selector 252.

The FIFO flag storage 259 is capable of storing N5 flags Intra/Inter_flag (N5 is a natural number), and stores the flag Intra/Inter_flag for the current macroblock. The flag Intra/Inter_flag set to "1" indicates an intra macroblock, whereas the flag Intra/Inter_flag set to "0" indicates an inter macroblock. When an image of an I frame (image signal) is input, the N5 pieces of data stored in the FIFO flag storage 259 are all reset to "1" indicating an intra macroblock.

The counter unit 260 counts the number of flags indicating an intra macroblock (with a value set to "1") among the N5 flags Intra/Inter_flag stored in the FIFO flag storage 259, and outputs the counted number to the current code amount correction unit 30 as the intra macroblock number intraNum.

The data transform unit 28 receives a target code amount, and calculates a target code amount per macroblock from the received target code amount. The data transform unit 28 then outputs the calculated target code amount per macroblock to the integration unit 29 as IdealMBBit.

The integration unit 29 receives the code amount recent_AllocatedBit for the macroblock that is one macroblock previous to the current macroblock from the FIFO code amount storage. The integration unit 29 receives the target code amount per macroblock IdealMBBit output from the data transform unit 28. The integration unit 29 then calculates the sum of differences between the actually generated code amount and the target code amount by performing the processing corresponding to the formula:

sum_diff=sum_diff+(Ideal*MB*Bit−recent_Allocated-Bit).

The initial value of the sum sum_diff of differences between the code amount to be generated and the target code amount is preferably set to "0."

The integration unit 29 outputs the obtained sum sum_diff of differences between the code amount to be generated and the target code amount to the current code amount correction unit 30.

As shown in FIG. 8, the current code amount correction unit 30 includes a code amount correction unit 301 and an intra MB code amount correction unit 302.

The code amount correction unit 301 receives an output from a current code amount calculation unit 24 and the sum sum_diff of differences between the code amount to be generated and the target code amount output from the integration unit 29. In the present embodiment, the output from the current code amount calculation unit 24 is a code amount current_AllocatedBit0. The code amount correction unit 301 obtains a corrected (adjusted) code amount current_AllocatedBit1 by performing the processing corresponding to the formula:

current_AllocatedBit1=current_AllocatedBit0+{sum_diff/(*k*1×2)}.

The code amount correction unit 301 outputs the corrected code amount current_AllocatedBit1 to the intra MB code amount correction unit 302.

The intra MB code amount correction unit 302 receives the flag Intra/Inter_flag, and the intra macroblock number intraNum in the predetermined period output from the median-QP-transformed code amount calculation unit 25A, and the corrected code amount current_AllocatedBit1 output from the code amount correction unit 301.

When the current macroblock is an intra macroblock and the intra macroblock number intraNum in the predetermined period is less than or equal to a threshold Th1, the intra MB code amount correction unit 302 corrects the code amount in a manner to allocate a larger amount of code to the current macroblock. The intra MB code amount correction unit 302 outputs the corrected code amount to the QP calculation unit 27 as the code amount current_AllocatedBit.

In any cases other than the above-described case, the intra MB code amount correction unit 302 outputs the code amount current_AllocatedBit1, which is output from the code amount correction unit 301, to the QP calculation unit 27 as the code amount current_AllocatedBit.

In the current code amount correction unit 30, the code amount correction unit 301 and/or the intra MB code amount correction unit 302 may be eliminated.

2.2 Operation of Moving Image Coding Apparatus

The operation of the moving image coding apparatus 2000 with the above-described structure will now be described.

The components that are the same as in the first embodiment will not be described in detail.

In the code amount transform unit 251 included in the median-QP-transformed code amount calculation unit 25A, the code amount recent_AllocatedBit of the macroblock that is one-macroblock previous to the input current macroblock is transformed to a median-QP-transformed code amount by quantizing the code amount recent_AllocatedBit using the median in the range of possible quantization parameter values in the quantization performed by the coding unit 1. The obtained median-QP-transformed code amount is output to the selector 252.

The selector 252 performs the selection described below.

(1) When the input flag Intra/Inter_flag has a value indicating an intra macroblock or in other words when the macroblock that is one-macroblock previous to the current macroblock is an intra macroblock, the output from the code amount transform unit 251 is output to the FIFO intra MB storage 253.

(2) When the input flag Intra/Inter_flag has a value indicating an inter macroblock or in other words when the macroblock that is one-macroblock previous to the current macroblock is an inter macroblock, the output from the code amount transform unit 251 is output to the FIFO inter MB storage 254.

When the macroblock that is one-macroblock previous to the current macroblock is an intra macroblock, the median-QP-transformed code amount obtained by the code amount transform unit 251, which is output from the selector 252, is stored into the FIFO intra MB storage 253.

When the macroblock that is one-macroblock previous to the current macroblock is an intra macroblock, the median-QP-transformed code amount obtained by the code amount transform unit 251, which is output from the selector 252, is stored into the FIFO inter MB storage 254.

The first average calculation unit 255 calculates the average of the N3 median-QP-transformed code amounts stored in the FIFO intra MB storage 253, and outputs the calculated the calculated average to the selector 257 as predBitQP26(1).

The second average calculation unit 256 calculates the average of the N4 median-QP-transformed code amounts stored in the FIFO inter MB storage 254, and outputs the calculated average to the selector 257 as predBitQP26(0).

The selector 257 performs the selection described below.

(1) When the input flag Intra/Inter_flag has a value indicating an intra macroblock or in other words when the current macroblock is an intra macroblock, the output predBitQP26(1) from the first average calculation unit 255 is output to the QP calculation unit 27 as predBitQP26.

(2) When the input flag Intra/Inter_flag has a value indicating an inter macroblock or in other words when the current macroblock is an inter macroblock, the output pred-BitQP26(0) from the second average calculation unit 256 is output to the QP calculation unit 27 as predBitQP26.

The flag Intra/Inter_flag for the current macroblock is stored into the FIFO flag storage 259.

The counter unit 260 counts the number of flags indicating an intra macroblock (with a value set to "1") among the N5 flags Intra/Inter_flag stored in the FIFO flag storage 259, and outputs the counted number to the current code amount correction unit 30 as the intra macroblock number intraNum.

The data transform unit 28 calculates a target code amount per macroblock IdealMBBit using the input target code amount, and outputs the calculated target code amount per macroblock IdealMBBit to the integration unit 29.

The integration unit 29 calculates the sum of differences between the actually generated code amount and the target code amount by subjecting the code amount recent_AllocatedBit of the macroblock that is one-macroblock previous to the current macroblock, which is output from the FIFO code amount storage, and the target code amount per macroblock IdealMBBit, which is output from the data transform unit 28, to the processing corresponding to the formula:

sum_diff=sum_diff+(Ideal*MB*Bit−recent_AllocatedBit).

The integration unit 29 outputs the sum sum_diff of differences between the code amount to be generated and the target code amount, which is generated through the above processing, to the current code amount correction unit 30.

The integration unit 29 may use a lower limit A1 and an upper limit A2 to limit the code amount IdealMBBit-recent_AllocatedBit within a predetermined range. The value may be clipped to satisfy A1≤(IdealMBBit−recent_AllocatedBit)≤A2. The value may be clipped by using only one of the upper limit and the lower limit.

The code amount correction unit 301 of the current code amount correction unit 30 obtains a corrected (adjusted) code amount current_AllocatedBit1 by subjecting the code amount current_AllocatedBit0, which is output from the current code amount calculation unit 24, and the sum sum_diff of differences between the code amount to be generated and the target code amount, which is output from the integration unit 29, to the processing corresponding to the formula:

current_AllocatedBit1=current_AllocatedBit0+{sum_diff/($k1$×2)}.

The sum sum_diff is the sum of differences between the code amount to be generated and the target code amount. When the sum of the previously used code amounts in units of macroblocks is greater than the sum of the target code amounts in units of macroblocks, the resulting sum sum_diff will be a negative value. In this case, the corrected code amount current_AllocatedBit1 obtained through the above processing will be smaller than the code amount current_AllocatedBit0 that has yet to be corrected. In this state, an excessively large amount of code is used, and thus the correction is needed to allocate a smaller code amount to the current macroblock. This enables appropriate code amount allocation. The code amount to be allocated to one macroblock can be calculated by dividing the sum sum_diff by the number of $k1$×2, which is the number of macroblocks for each of which the target code amount is to be set.

When the sum of the previously used code amounts in units of macroblocks is smaller than the sum of the target code amounts in units of macroblocks, the resulting sum sum_diff will be a positive value. In this case, the corrected code amount current_AllocatedBit1 obtained through the above processing will be larger than the code amount current_AllocatedBit0 that has yet to be corrected. In this state, a code amount less than the available code amount is used, and thus the correction is needed to allocate a larger code amount to the current macroblock. This enables appropriate code amount allocation.

The sum sum_diff is the sum of differences between the code amount to be generated and the target code amount. The processing thus achieves higher precision than when, for example, the code amount allocation control is performed simply by using a difference between the code amount to be generated and the target code amount in a predetermined period. For example, the above processing enables appropriate code amount allocation control across a plurality of pictures.

The code amount correction unit 301 outputs the corrected code amount current_AllocatedBit1 to the intra MB code amount correction unit 302.

The code amount correction unit 301 may use a lower limit B1 and an upper limit B2 to limit the corrected code amount current_AllocatedBit1 within a predetermined range. The value may be clipped to satisfy B1≤IdealMBBit−recent_AllocatedBit≤B2. The value may be clipped by using only one of the upper limit and the lower limit.

The intra MB code amount correction unit 302 determines whether the current macroblock is an intra macroblock by using the flag Intra/Inter_flag. The intra MB code amount correction unit 302 determines whether the intra macroblock number intraNum in the predetermined period is less than or equal to the threshold Th1.

When the current macroblock is an intra macroblock and the intra macroblock number intraNum in the predetermined period is less than or equal to the threshold Th1, the intra MB code amount correction unit 302 performs the correction in a manner to allocate a larger code amount to the current macroblock. In this case, the intra MB code amount correction unit 302 may correct the code amount to be allocated by, for example, performing the processing corresponding to the formula:

current_AllocatedBit=current_AllocatedBit1+add1, where add1 (>0) is a code amount to be added.

The intra MB code amount correction unit 302 may perform the processing described below by using the average predBitQP26(1) of the median-QP-transformed code amounts for intra macroblocks, which is obtained by the first average calculation unit 255 of the median-QP-transformed code amount calculation unit 25A, and the average predBitQP26(0)d of the median-QP-transformed code amounts for intra macroblocks, which is obtained by the second average calculation unit 256 of the median-QP-transformed code amount calculation unit 25A.

(1) The values below are substituted into variables intraPred, interPred, and addbit:

intraPred=predBit*QP*26(1)

interPred=predBit*QP*26(0)

addbit=interPred/2

(2) The value (intraPred+addbit) and the value interPred are compared with each other. When (intraPred+addbit)≥interPred, the subtraction expressed as intraPred=intraPred−addbit is performed. This subtraction is then repeated until the inequality (intraPred+addbit)<interPred is satisfied. The number of times the subtraction is repeated is set as NA.

(3) The corrected code amount current_AllocatedBit is obtained by performing the processing described below:

current_AllocatedBit=current_AllocatedBit1+
current_AllocatedBit1×0.5×NA.

The intra MB code amount correction unit 302 may correct the code amount to be allocated by performing the above processing.

When the current macroblock is not an intra macroblock based on the flag Intra/Inter_flag, or when the current macroblock is an intra macroblock but the intra macroblock number intraNum in the predetermined period is not less than or equal to the threshold Th1, the intra MB code amount correction unit 302 outputs the input code amount current_AllocatedBit1 to the QP calculation unit 27 as the code amount current_AllocatedBit.

As described above, when the number of intra macroblocks is small in the predetermined period, the code amount allocated to each intra macroblock can often be too small. In this case, the above processing enables a larger code amount to be allocated to each intra macroblock, and enables appropriate use of the unused available code amount (remaining code amount).

When the intra MB code amount correction unit 302 performs the correction in a manner to allocate a larger code amount to an intra macroblock as described above, the code amount correction unit 301 may perform correction only in a manner to reduce the code amount.

The intra MB code amount correction unit 302 may use a lower limit C1 and an upper limit C2 to limit the corrected code amount current_AllocatedBit within a predetermined range. The value may be clipped to satisfy C1≤current_AllocatedBit≤C2. The value may be clipped by using only one of the upper limit and the lower limit.

The QP calculation unit 27 calculates the quantization parameter QP to be used in coding the current macroblock by using the code amount current_AllocatedBit output from the current code amount correction unit 30 in the same manner as in the first embodiment. The QP value may be clipped to a value below a predetermined value to prevent rapid change of the QP value. In other words, the QP value may be set to satisfy abs(diff_QP)<D1, where diff_QP is a difference between the QP value of the current macroblock and the QP value of the macroblock that is one-macroblock previous to the current macroblock, and D1 is a positive constant.

In the moving image coding apparatus 2000 described above, the current code amount correction unit 30 corrects the code amount based on the sum sum_diff of differences between the code amount to be generated and the target code amount. When an available code amount remains unused, the correction is performed to allocate a larger code amount to the current macroblock. When an excessively large code amount is used, the correction is performed to allocate a smaller code amount to the current macroblock. Thus, the moving image coding apparatus 2000 enables more appropriate code amount allocation than in the first embodiment.

In the moving image coding apparatus 2000, the current code amount correction unit 30 allocates a larger code amount to each intra macroblock when the number of intra macroblocks is small in the predetermined period. This enables a larger code amount to be allocated to each intra macroblock, and enables the moving image coding with higher quality.

In the moving image coding apparatus 2000, the median-QP-transformed code amount calculation unit 25A includes the FIFO intra MB storage 253, which stores only the median-QP-transformed code amounts for intra macroblocks, and the FIFO inter MB storage 254, which stores only the median-QP-transformed code amounts for inter macroblocks. (1) When the current macroblock is an intra macroblock, the moving image coding apparatus 2000 performs QP calculation by using only the average of the median-QP-transformed code amounts for intra macroblocks. (2) When the current macroblock is an inter macroblock, the moving image coding apparatus 2000 performs QP calculation by using only the average of the median-QP-transformed code amounts for inter macroblocks. Thus, the moving image coding apparatus 2000 enables more appropriate code amount allocation to intra macroblocks and to inter macroblocks. If the QP calculation is performed by using the average of code amounts calculated without differentiating between intra macroblocks and inter macroblocks, the average of the code amounts will be large when the macroblocks include a large number of intra macroblocks. In this case, only a smaller code amount would be allocated to an inter macroblock when a larger code amount is actually available for the inter macroblock. This disables appropriate code amount allocation. The moving image coding apparatus 2000 performs the QP calculation by differentiating between intra macroblocks and inter macroblocks as described above, and thus can enable appropriate code amount allocation whether or not the current macroblock is an intra macroblock or an inter macroblock.

Other Embodiments

Although the processes are performed through calculations using real numbers (calculations using floating point numbers) in the above embodiment, the above embodiment should not be limited to this method. The processes may be performed through calculations using integers. In this case, the values may be rounded off as appropriate in accordance with required precision. In the above embodiment, the processing including nonlinear processing or processing using nonlinear functions (e.g., processing corresponding to log 2(x) function) or division written as $2^{((C0-recent\_AllocatedBit)/6)}$ may be performed by, for example, using a lookup table (LUT).

Although the motion estimate unit 108 searches for motions to obtain the SATD for the current macroblock in the above embodiment, the embodiment should not be limited to this method. The motion estimate unit 108 may not be designed to obtain the SATD. In this case, the apparatus should additionally include a functional unit for obtaining the SATD.

Some or all of the components of the moving image coding apparatus of the above embodiment may be formed using an integrated circuit (e.g., LSI or a system LSI).

All or part of the processes performed by the functional blocks described in the above embodiment may be implemented using programs. All or part of the processes performed by the functional blocks described in the above embodiment may be implemented by a central processing unit (CPU) in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware. When the moving image coding apparatus of the above embodiment is implemented by hardware, the moving image coding apparatus requires timing adjustment for their processes. For ease of explanation, the timing adjustment associated with various signals required in an actual hardware design is not described in detail in the above embodiment.

The processes described in the above embodiment may not be performed in the order specified in the above embodiment. The order in which the processes are performed may be changed without departing from the scope and the spirit of the invention.

The present invention may also include a computer program enabling a compute to implement the method described in the above embodiment and a non-transitory computer readable recording medium on which such a program is recorded. The non-transitory computer readable recording medium may be, for example, a flexible disk, a hard disk, a CD-ROM, an MO, a DVD, a DVD-ROM, a DVD-RAM, a Blu-ray disc, or a semiconductor memory.

The computer program should not be limited to a computer program recorded on the recording medium, but may be a computer program transmitted with an electric communication line, a radio or cable communication line, or a network such as the Internet.

The specific structures described in the above embodiment are mere examples of the present invention, and may be changed and modified variously without departing from the scope and the spirit of the invention.

APPENDIXES

The present invention may also be expressed in the following forms.

A first aspect of the present invention provides a moving image coding apparatus that codes a moving image signal for forming a frame image including a plurality of macroblocks, and controls an amount of code to be generated in coding the moving image signal. The apparatus includes a target code amount setting unit, a quantization parameter determination unit, a coding unit, a storage unit, and a motion estimate unit.

The target code amount setting unit designates the number of macroblocks and set a target code amount as a code amount to be allocated to the designated number of macroblocks.

The quantization parameter determination unit determines a quantization parameter value to be used in quantization performed in coding the moving image signal.

The coding unit codes the moving image signal and performs quantization with respect to the moving image signal using the quantization parameter value determined by the quantization parameter determination unit.

The coding unit includes a storage unit and a motion estimate unit.

The storage unit stores at least one previous frame image.

The motion estimate unit obtains a difference image by extracting a reference frame image from the at least one previous frame image stored in the storage unit and calculating a difference between a current macroblock that is a processing target macroblock and an image region of the reference frame image having the same size as the current macroblock, obtains a sum of absolute transformed differences of the obtained difference image, and calculates a motion vector based on the obtained sum of absolute transformed differences.

The quantization parameter determination unit determines the quantization parameter value based on the sum of absolute transformed differences for the current macroblock obtained by the motion estimate unit.

This moving image coding apparatus determines the quantization parameter value by using the SATD obtained through a motion estimate process for the current macroblock. The SATD obtained through the motion estimate process for the current macroblock correlates strongly with the code amount actually used (generated) in coding the current macroblock. Thus, determining the quantization parameter using the SATD enables appropriate control of the code amount. More specifically, the moving image coding apparatus designates the number of macroblocks and sets the target code amount as the code amount to be allocated to the designated number of macroblocks, and determines the quantization parameter value for each macroblock based on the SATD that correlates strongly with the code amount to be generated for each macroblock. The moving image coding apparatus can thus perform appropriate code amount control in units shorter than frames. Further, the moving image coding apparatus determines quantization parameter values by calculations, and thus may eliminate thresholding.

A second aspect of the invention provides the moving image coding apparatus of the first aspect of the invention in which the target code amount setting unit sets a target code amount targetBit as a code amount to be allocated to 2×k1 macroblocks (k1 is a natural number).

The quantization parameter determination unit includes a FIFO SATD storage, a FIFO code amount storage, a current code amount calculation unit, a median-QP-transformed code amount calculation unit, and a QP calculation unit.

The FIFO SATD storage can store sums of absolute transformed differences for N1 macroblocks (N1 is a natural number), and stores the sum of absolute transformed differences for the current macroblock obtained by the motion estimate unit.

The FIFO code amount storage can store code amounts for N1 macroblocks (N1 is a natural number), and stores a code amount used (generated) when a macroblock that is one-macroblock previous to the current macroblock is coded.

The current code amount calculation unit (1) obtains, from the FIFO SATD storage, a sum of absolute transformed differences recent_SATD for the current macroblock and sums of absolute transformed differences for k1 previous macroblocks (k1 is a natural number, and k1≤N1), calculates an average avrg_AllocatedBit of the sums of absolute transformed differences for the k1 previous macroblocks, (2) obtains, from the FIFO code amount storage, code amounts for k1 previous macroblocks (k1 is a natural number, and k1≤N1), calculates an average avrg_AllocatedBit of the code amounts for the k1 previous macroblocks, and calculates a total code amount usedBit allocated to the k1 previous macroblocks, and calculates a code amount current_AllocatedBit to be allocated to the current macroblock by using the formulas:

allocatedBit=targetBit−usedBit, avrg_AllocatedBit=allocatedBit/k1, and current_AllocatedBit=avrg_AllocatedBit+coex(recent_SATD−avrg_SATD), where coe is a coefficient.

The median-QP-transformed code amount calculation unit obtains, from the FIFO code amount storage, a code amount recent_AllocatedBit for the macroblock that is one-macroblock previous to the current macroblock, and calculates a median-QP-transformed code amount by quantizing the obtained code amount recent_AllocatedBit using a median of possible quantization parameter values in the quantization performed by the coding unit.

The QP calculation unit calculates a quantization parameter value to be used in coding the current macroblock based on the transformed code amount calculated by the median-QP-transformed code amount calculation unit for the macroblock that is one-macroblock previous to the current macroblock and the code amount current_AllocatedBit to be allocated to the current macroblock calculated by the current code amount calculation unit.

This moving image coding apparatus sets the target code amount as the code amount to be allocated to the 2×k1 macroblocks (k1 is a natural number), and thus calculates the code amount to be allocated to the current macroblock with high precision using the code amounts and the SATDs for the k1 previous macroblocks. The moving image coding apparatus also calculates the transformed code amount by quantizing the generated code amount for the macroblock that is one-macroblock previous to the current macroblock using a substantial median of possible quantization parameter values, and calculates the quantization parameter value based on the relationship between the calculated transformed code amount and the code amount to be allocated to the current macroblock calculated by using the code amounts and the SATDs for the k1 previous macroblocks.

This moving image coding apparatus can thus perform appropriate code amount control in units shorter than frames. Further, this moving image coding apparatus determines quantization parameter values by calculations, and thus may eliminate thresholding.

A third aspect of the invention provides the moving image coding apparatus of either the first or second aspect of the invention in which the quantization parameter determination unit further includes an IIR filter unit that obtains a median-QP-transformed code amount predBitQP26 by performing IIR filtering with respect to the median-QP-transformed code amount bitQP26 calculated by the median-QP-transformed code amount calculation unit using the code amount recent_AllocatedBit for the macroblock that is one-macroblock previous to the current macroblock.

The QP calculation unit calculates a quantization parameter value QP to be used in coding the current macroblock by using the formula:

$$QP=C0-6\times\log 2(\text{current\_AllocatedBit}/\text{predBit}QP26),$$

where C0 is a median of possible quantization parameter values, and log 2( ) is a function that calculates a logarithm to the base 2.

This moving image coding apparatus sets a target code amount in units of predetermined numbers of macroblocks (e.g., a code amount to be allocated to 2×k1 macroblocks) targetBit, and calculates the code amount current_AllocatedBit to be allocated to the current macroblock based on changes in the SATD that correlates strongly with the code amount to be generated and the code amounts allocated to k1 previous macroblocks by using the formulas:

allocatedBit=targetBit−usedBit, avrg_AllocatedBit=allocatedBit/k1, and current_AllocatedBit=avrg_AllocatedBit+ coex(recent_SATD−avrg_SATD).

This moving image coding apparatus further determines the quantization parameter QP to be used in quantization of the current macroblock in accordance with the ratio (relationship) between the transformed code amount predBitQP26, which is obtained by transforming the code amount allocated to the macroblock that is one-macroblock previous to the current macroblock using the median of QP values (the transformed code amount processed through IIR filtering), and the current code amount current_AllocatedBit to be allocated to the current macroblock by using the formula:

$$QP=C0-6\times\log 2(\text{current\_AllocatedBit}/\text{predBit}QP26),$$

where C0 is the median of QP values (the median is set to, for example, 26 when the QP values are in the range of 0 to 51). This moving image coding apparatus determines (estimates) the code amount current_AllocatedBit allocated to the current macroblock using the SATD that correlates strongly with the code amount to be generated, and thus reduces errors (differences) between the code amount actually used (generated) for the current macroblock and the code amount current_AllocatedBit allocated to the current macroblock. The moving image coding apparatus determines the quantization parameter QP used in quantization of the current macroblock in accordance with the ratio (relationship) between the transformed code amount predBitQP26, which is obtained by transforming the code amount allocated to the macroblock that is one-macroblock previous to the current macroblock using the median of QP values (the transformed code amount processed through IIR filtering), and the current code amount current_AllocatedBit to be allocated to the current macroblock. As a result, the moving image coding apparatus calculates the quantization parameter QP with high precision. The code amount to be generated for each signal coded by the moving image coding apparatus approaches its target code amount. The moving image coding apparatus can thus control the code amount using a constant bit rate (CBR) easily and with high precision.

A fourth aspect of the invention provides the moving image coding apparatus of the second aspect of the invention in which the median-QP-transformed code amount calculation unit includes a code amount transform unit, a FIFO intra MB storage, a FIFO inter MB storage, a first average calculation unit, and a second average calculation unit.

The code amount transform unit transforms a code amount recent_AllocatedBit of a macroblock that is one-macroblock previous to a current macroblock to a transformed code amount by quantizing the code amount recent_AllocatedBit using a median of possible quantization parameter values in the quantization performed by the coding unit.

The FIFO intra MB storage stores median-QP-transformed code amounts for N3 intra macroblocks (N3 is a natural number). The FIFO intra MB storage stores the transformed code amount obtained by the code amount transform unit when the macroblock that is one-macroblock previous to the current macroblock is an intra macroblock.

The FIFO inter MB storage stores median-QP-transformed code amounts for N4 inter macroblocks (N4 is a natural number). The FIFO inter MB storage stores the transformed code amount obtained by the code amount transform unit when the macroblock that is one-macroblock previous to the current macroblock is an inter macroblock.

The first average calculation unit calculates an average predBitQP26(1) of median-QP-transformed code amounts for N3 intra macroblocks stored in the FIFO intra MB storage.

The second average calculation unit calculates an average predBitQP26(0) of median-QP-transformed code amounts for N4 inter macroblocks stored in the FIFO inter MB storage.

The QP calculation unit (1) calculates the quantization parameter value to be used in coding the current macroblock based on the average predBitQP26(1) of the median-QP-transformed code amounts of the intra macroblocks when the current macroblock is an intra macroblock, and (2) calculates the quantization parameter value to be used in coding the current macroblock based on the average predBitQP26(0) of the median-QP-transformed code amounts of the inter macroblocks when the current macroblock is an inter macroblock.

In this moving image coding apparatus, the median-QP-transformed code amount calculation unit includes the FIFO intra MB storage, which stores only the median-QP-transformed code amounts for intra macroblocks, and the FIFO inter MB storage, which stores only the median-QP-transformed code amounts for inter macroblocks. (1) When the current macroblock is an intra macroblock, this moving image coding apparatus performs the QP calculation by using only the average of the median-QP-transformed code amounts for intra macroblocks. (2) When the current macroblock is an inter macroblock, this moving image coding apparatus performs the QP calculation by using only the average of the median-QP-transformed code amounts for inter macroblocks. This moving image coding apparatus can thus enable more appropriate code amount allocation to intra macroblocks and to inter macroblocks. If the QP calculation is performed by using the average of code amounts calculated without differentiating between intra macroblocks and inter macroblocks, the average of the code amounts will be large when the macroblocks include a larger number of intra macroblocks. In this case, only a smaller code amount would be allocated to an inter macroblock when a larger code amount is actually available for the inter macroblock. This disables appropriate code amount allocation. This moving image coding apparatus performs the QP calculation by differentiating between intra macroblocks and inter macroblocks as described above, and thus can enable appropriate code amount allocation whether or not the current macroblock is an intra macroblock or an inter macroblock.

A fifth aspect of the invention provides the moving image coding apparatus of the fourth aspect of the invention in which (1) when the current macroblock is an intra macroblock, the QP calculation unit calculates the quantization parameter value QP to be used in coding the current macroblock by using the formula:

$$QP = C0 - 6 \times \log 2(\text{current\_AllocatedBit}/\text{predBit}QP26(1)),$$

where C0 is a median of possible quantization parameter values, and log 2( ) is a function that calculates a logarithm to the base 2, and (2) when the current macroblock is an inter macroblock, the QP calculation unit calculates the quantization parameter value QP to be used in coding the current macroblock by using the formula:

$$QP = C0 - 6 \times \log 2(\text{current\_AllocatedBit}/\text{predBit}QP26(0)),$$

where C0 is a median of possible quantization parameter values, and log 2( ) is a function that calculates a logarithm to the base 2.

Through the processing described above, this moving image coding apparatus performs the QP calculation by differentiating between intra macroblocks and inter macroblocks. This moving image coding apparatus can thus enable appropriate code amount allocation whether or not the current macroblock is an intra macroblock or an inter macroblock.

A sixth aspect of the invention provides the moving image coding apparatus of either the fourth or fifth aspect of the invention in which the quantization parameter determination unit further includes a data transform unit, an integration unit, and a current code amount correction unit.

The data transform unit obtains a target code amount per macroblock IdealMBBit from the target code amount targetBit.

The integration unit calculates a sum sum_diff of differences between an actually generated code amount and a target code amount using a code amount recent_AllocatedBit of the macroblock that is one-macroblock previous to the current macroblock and the target code amount IdealMBBit by performing processing corresponding to the formula:

$$\text{sum\_diff} = \text{sum\_diff} + (\text{Ideal}MB\text{Bit} - \text{recent\_AllocatedBit}).$$

The current code amount correction unit corrects the code amount current_AllocatedBit to be allocated to the current macroblock calculated by the current code amount calculation unit based on the sum sum_diff.

The QP calculation unit calculates the quantization parameter value to be used in coding the current macroblock based on the code amount current_AllocatedBit corrected by the current code amount correction unit.

In this moving image coding apparatus, the current code amount correction unit corrects the code amount based on the sum sum_diff of differences between the code amount to be generated and the target code amount. When an available code amount remains unused, the correction is performed to allocate a larger code amount to the current macroblock. When an excessively large code amount is used, the correction is performed to allocate a smaller code amount to the current macroblock. Thus, this moving image coding apparatus enables appropriate code amount allocation.

A seventh aspect of the invention provides the moving image coding apparatus of the sixth aspect of the invention in which when the code amount current_AllocatedBit to be allocated to the current macroblock calculated by the current code amount calculation unit is a code amount current_AllocatedBit0, the current code amount correction unit obtains a corrected code amount current_AllocatedBit1 by performing processing corresponding to the formula:

$$\text{current\_AllocatedBit1} = \text{current\_AllocatedBit0} + \{\text{sum\_diff}/(k1 \times 2)\}.$$

(1) When the current macroblock is an intra macroblock, the QP calculation unit calculates, based on the corrected code amount current_AllocatedBit1 obtained by the current code amount correction unit, the quantization parameter value QP to be used in coding the current macroblock by using the formula:

$$QP = C0 - 6 \times \log 2(\text{current\_AllocatedBit1}/\text{predBit}QP26(1))$$

where C0 is the median of possible quantization parameter values, and log 2( ) is a function that calculates a logarithm to the base 2.

(2) When the current macroblock is an inter macroblock, the QP calculation unit calculates, based on the corrected code amount current_AllocatedBit1 obtained by the current code amount correction unit, the quantization parameter value QP to be used in coding the current macroblock by using the formula:

$$QP = C0 - 6 \times \log 2(\text{current\_AllocatedBit1}/\text{predBit}QP26(0))$$

where C0 is the median of possible quantization parameter values, and log 2( ) is a function that calculates a logarithm to the base 2.

In this moving image coding apparatus, the current code amount correction unit performs the above processing based on the sum sum_diff of differences between the code amount to be generated and the target code amount, and thus can correct the code amount to be allocated in an appropriate manner both when an available code amount remains unused and when an excessively large code amount is used. This moving image coding apparatus can thus enable appropriate code amount allocation.

An eighth aspect of the invention provides the moving image coding apparatus of either the sixth or seventh aspect of the invention in which the median-QP-transformed code amount calculation unit obtains an intra macroblock number intraNum that is the number of intra macroblocks occurring in a predetermined previous period.

When the current macroblock is an intra macroblock and the intra macroblock number intraNum in the predetermined previous period is less than or equal to a predetermined threshold, the current code amount correction unit corrects the code amount current_AllocatedBit by performing processing corresponding to the formula:

$$\text{current\_AllocatedBit} = \text{current\_AllocatedBit1} + \text{add1},$$

where add1 (>0) is a code amount to be added.

The QP calculation unit calculates the quantization parameter value to be used in coding the current macroblock based on the code amount current_AllocatedBit corrected by the current code amount correction unit.

In this moving image coding apparatus, the current code amount correction unit can allocate a larger code amount to each intra macroblock when the number of intra macroblocks is small in a predetermined period. This enables a larger code amount to be allocated to each intra macroblock, and enables the moving image coding with higher quality.

A ninth aspect of the invention provides a method for controlling a code amount used in coding a moving image signal for forming a frame image including a plurality of macroblocks. The method includes a target code amount setting step, an SATD value obtaining step, a current code amount calculation step, a media-QP-transformed code amount calculation step, an IIR filtering step, and a quantization parameter determination step.

In the target code amount setting step, a target code amount targetBit is set as a code amount to be allocated to 2×k1 macroblocks (k1 is a natural number).

In the SATD obtaining step, a sum of absolute transformed differences calculated from a difference image indicating a difference between a current macroblock and a corresponding image region of a reference frame image in a motion estimate process is obtained.

In the code amount calculation step, a sum of absolute transformed differences recent_SATD for the current macroblock and sums of absolute transformed differences for k1 previous macroblocks (k1 is a natural number, and k1≤N1) are obtained, and an average avrg_AllocatedBit of the sums of absolute transformed differences for the k1 previous macroblocks is calculated. Code amounts for k1 previous macroblocks (k1 is a natural number, and k1≤N1) are obtained, and an average avrg_AllocatedBit of the code amounts for the k1 previous macroblocks is calculated. A total code amount usedBit allocated to the k1 previous macroblocks is calculated. A code amount current_AllocatedBit to be allocated to the current macroblock is calculated by using the formulas:

$$\text{AllocatedBit} = \text{targetBit} - \text{usedBit},$$

$$\text{avrg\_AllocatedBit} = \text{allocatedBit}/k1,$$

and $$\text{current\_AllocatedBit} = \text{avrg\_AllocatedBit} + \text{coex}(\text{recent\_SATD} - \text{avrg\_SATD}),$$

where coe is a coefficient.

In the median-QP-transformed code amount calculation step, a code amount recent_AllocatedBit for a macroblock that is one-macroblock previous to the current macroblock is obtained, and a transformed code amount bitQP26 is calculated by quantizing the obtained code amount recent_AllocatedBit using a median of possible quantization parameter values in a quantization performed in coding the moving image signal.

In the IIR filtering step, a median-QP-transformed code amount predBitQP26 is obtained by performing IIR filtering with respect to the median-QP-transformed code amount bitQP26 calculated in the step of calculating the median-QP-transformed code amount using the code amount recent_AllocatedBit for the macroblock that is one-macroblock previous to the current macroblock.

In the quantization parameter determination step, a quantization parameter value QP to be used in coding the current macroblock is calculated by using the formula:

$$QP = C0 - 6 \times \log 2(\text{current\_AllocatedBit}/\text{predBit}QP26),$$

where C0 is a median of possible quantization parameter values, and log 2( ) is a function that calculates a logarithm to the base 2.

With this code amount control method, the target code amount targetBit is set in units of predetermined numbers of macroblocks (e.g., the code amount to be allocated to 2×k1 macroblocks), and the code amount current_AllocatedBit to be allocated to the current macroblock is calculated based on the code amount allocated to k1 previous macroblocks and changes in the SATD that correlates strongly with the code amount to be generated by using the formulas:

$$\text{allocatedBit} = \text{targetBit} - \text{usedBit},$$

$$\text{avrg\_AllocatedBit} = \text{allocatedBit}/k1,$$

and $$\text{current\_AllocatedBit} = \text{avrg\_AllocatedBit} + \text{coex}(\text{recent\_SATD} - \text{avrg\_SATD}).$$

With this code amount control method, the quantization parameter value QP used in coding the current macroblock is calculated in accordance with the ratio (relationship) between the transformed code amount predBitQP26, which is obtained by transforming the code amount allocated to the macroblock that is one-macroblock previous to the current macroblock using the median of QP values (the transformed code amount processed through IIR filtering), and the current code amount current_AllocatedBit to be allocated to the current macroblock by using the formula:

$$QP=C0-6\times\log 2(\text{current\_AllocatedBit}/\text{predBit}QP26),$$

where C0 is the median of QP values (the median is set to, for example, 26 when the QP values are in the range of 0 to 51).

With this moving image coding method, the code amount current_AllocatedBit allocated to the current macroblock is determined (estimated) using the SATD that correlates strongly with the code amount to be generated. This method thus reduces errors (differences) between the code amount actually used (generated) for the current macroblock and the code amount current_AllocatedBit allocated to the current macroblock. With the moving image coding method, the quantization parameter QP to be used in quantization of the current macroblock is determined in accordance with the ratio (relationship) between the transformed code amount predBitQP26, which is obtained by transforming the code amount allocated to the macroblock that is one-macroblock previous to the current macroblock using the median of QP values (the transformed code amount processed through IIR filtering), and the current code amount current_AllocatedBit to be allocated to the current macroblock. With the moving image coding method, the quantization parameter QP is calculated with high precision. The code amount to be generated for each signal coded with the moving image coding method approaches its target code amount. This moving image coding method can thus control the code amount using a constant bit rate (CBR) easily and with high precision.

A tenth aspect of the invention provides a method for controlling a code amount to be generated in coding a moving image signal for forming a frame image including a plurality of macroblocks. The method includes a target code amount setting process, an SATD value obtaining process, a current code amount calculation process, a code amount transform process, an intra MB storage process, an inter MB storage process, a first average calculation process, a second average calculation process, and a QP calculation process.

In the target code amount setting process, a target code amount targetBit is set as a code amount to be allocated to $2\times k1$ macroblocks ($k1$ is a natural number).

In the SATD value obtaining process, a sum of absolute transformed differences calculated from a difference image indicating a difference between a current macroblock and a corresponding image region of a reference frame image in a motion estimate process is obtained.

In the current code amount calculation process, a sum of absolute transformed differences recent_SATD for the current macroblock and sums of absolute transformed differences for k1 previous macroblocks (k1 is a natural number and k1≤N1) are obtained, and an average avrg_AllocatedBit of the sums of absolute transformed differences for the k1 previous macroblocks is calculated. In the current code amount calculation process, code amounts for k1 previous macroblocks (k1 is a natural number and k1≤N1) are obtained, and an average avrg_AllocatedBit of the code amounts for the k1 previous macroblocks is calculated, and a total code amount usedBit allocated to the k1 previous macroblocks is calculated, and a code amount current_AllocatedBit to be allocated to the current macroblock is calculated by using the formulas:

allocatedBit=targetBit−usedBit, avrg_AllocatedBit=allocatedBit/k1, and current_AllocatedBit=avrg_AllocatedBit+coex(recent_SATD−avrg_SATD), where coe is a coefficient;

In the code amount transform process, a code amount recent_AllocatedBit for a macroblock that is one-macroblock previous to the current macroblock is transformed to a transformed code amount by quantizing the code amount recent_AllocatedBit using a median of possible quantization parameter values in a quantization performed in coding the moving image signal.

In the intra MB storage process, the transformed code amount obtained in the code amount transform process is stored for an intra macroblock when the macroblock that is one-macroblock previous to the current macroblock is an intra macroblock.

In the inter MB storage process, the transformed code amount obtained in the code amount transform process is stored for an inter macroblock when the macroblock that is one-macroblock previous to the current macroblock is an inter macroblock.

In the first average calculation process, a first average predBitQP26(1) of median-QP-transformed code amounts for intra macroblocks stored in the intra MB storage process is calculated.

In the second average calculation process, a second average predBitQP26(0) of median-QP-transformed code amounts for inter macroblocks stored in the inter MB storage process is calculated.

In the QP calculation process, (1) a quantization parameter value to be used in coding the current macroblock is calculated based on the average predBitQP26(1) of median-QP-transformed code amounts for intra macroblocks when the current macroblock is an intra macroblock, and (2) the quantization parameter value to be used in coding the current macroblock is calculated based on the average predBitQP26(0) of median-QP-transformed code amounts for inter macroblocks when the current macroblock is an inter macroblock.

With this code amount control method, (1) when the current macroblock is an intra macroblock, the QP calculation is performed by using only the average of median-QP-transformed code amounts for intra macroblocks, and (2) when the current macroblock is an inter macroblock, the QP calculation is performed by using only the average of median-QP-transformed code amounts for inter macroblocks. This code amount control method thus enables more appropriate code amount allocation to intra macroblocks and to inter macroblocks. If the QP calculation is performed by using the average of code amounts calculated without differentiating between intra macroblocks and inter macroblocks, the average of the code amounts will be large when the macroblocks include a larger number of intra macroblocks. In this case, only a smaller code amount would be allocated to an inter macroblock when a larger code amount is actually available for the inter macroblock. This disables appropriate code amount allocation. This moving image coding method includes the QP calculation performed by differentiating between intra macroblocks and inter macroblocks as described above, and thus can enable appropriate code amount allocation whether or not the current macroblock is an intra macroblock or an inter macroblock.

An eleventh aspect of the invention provides a computer readable storage medium storing a program enabling a computer to implement the code amount control method according to the ninth or tenth aspect of the invention.

The computer readable storage medium storing a program enabling a computer to implement the moving image control method has the same advantageous effects as the moving image control method of the ninth or tenth aspect of the present invention.

What is claimed is:

1. A moving image coding apparatus that codes a moving image signal for forming a frame image including a plurality of macroblocks, and controls an amount of code to be generated in coding the moving image signal, the apparatus comprising:
   a target code amount setting unit configured to designate the number of said macroblocks in said plurality of macroblocks and set a target code amount as a code amount to be allocated to the designated number of said macroblocks;
   a quantization parameter determination unit configured to determine a quantization parameter value to be used in quantization performed in coding the moving image signal and allocate a code amount to a current macroblock that is a processing target macroblock in accordance with the target code amount and code amounts used for a plurality of previously processed ones of said plurality of macroblocks; and
   a coding unit configured to code the moving image signal and perform quantization with respect to the moving image signal using the quantization parameter value determined by the quantization parameter determination unit,
   wherein the coding unit includes a storage unit configured to store at least one previous frame image, and a motion estimate unit configured to obtain a difference image by extracting a reference frame image from the at least one previous frame image stored in the storage unit and calculating a difference between the current macroblock and an image region of the reference frame image having the same size as the current macroblock, obtain a sum of absolute transformed differences of the obtained difference image, and calculate a motion vector based on the obtained sum of absolute transformed differences, and
   the quantization parameter determination unit determines the quantization parameter value based on the sum of absolute transformed differences for the current macroblock obtained by the motion estimate unit.

2. The moving image coding apparatus according to claim 1, wherein
   the target code amount setting unit sets a target code amount targetBit as a code amount to be allocated to 2×k1 macroblocks, where k1 is a natural number, and
   the quantization parameter determination unit includes
   a FIFO (First In First Out) SATD (Sum of Absolute Transformed Differences) storage configured to store sums of absolute transformed differences for N1 macroblocks, where N1 is a natural number, and store the sum of absolute transformed differences for the current macroblock obtained by the motion estimate unit,
   a FIFO code amount storage configured to store code amounts for N1 macroblocks, where N1 is a natural number, and store a code amount generated when a macroblock that is one-macroblock previous to the current macroblock is coded,
   a current code amount calculation unit configured to obtain, from the FIFO SATD storage, a sum of absolute transformed differences recent_SATD for the current macroblock and sums of absolute transformed differences for k1 previous macroblocks in said plurality of macroblocks, where k1 is a natural number and k1≤N1, calculate an average avrg_AllocatedBit of the sums of absolute transformed differences for the k1 previous macroblocks, obtain, from the FIFO code amount storage, code amounts for k1 previous macroblocks in said plurality of macroblocks, where k1 is a natural number and k1≤N1, calculate an average avrg_AllocatedBit of the code amounts for the k1 previous macroblocks, and calculate a total code amount usedBit allocated to the k1 previous macroblocks, and calculate a code amount current_AllocatedBit to be allocated to the current macroblock by using the formulas:

allocatedBit=targetBit−usedBit, avrg_AllocatedBit=allocatedBit/$k1$, and current_AllocatedBit=avrg_AllocatedBit+ coex(recent_SATD−avrg_SATD), where coe is a coefficient,
   a median-QP-transformed code amount calculation unit configured to obtain, from the FIFO code amount storage, a code amount recent_AllocatedBit for the macroblock that is one-macroblock previous to the current macroblock, and calculate a median-QP-transformed code amount by quantizing the obtained code amount recent_AllocatedBit using a median of possible quantization parameter values in the quantization performed by the coding unit, and
   a QP calculation unit configured to calculate a quantization parameter value to be used in coding the current macroblock based on the median-QP-transformed code amount calculated by the median-QP-transformed code amount calculation unit for the macroblock that is one-macroblock previous to the current macroblock and the code amount current_AllocatedBit to be allocated to the current macroblock calculated by the current code amount calculation unit, and
   wherein
   (1) when the current macroblock is an intra macroblock, the QP calculation unit calculates the quantization parameter value QP to be used in coding the current macroblock by using the formula:

$QP=C0-6\times \log 2(\text{current\_AllocatedBit}/\text{predBit}QP26$ (1)), where C0 is a median of possible quantization parameter values, and
   log 2( ) is a function that calculates a logarithm to the base 2, and
   (2) when the current macroblock is an inter macroblock, the QP calculation unit calculates the quantization parameter value QP to be used in coding the current macroblock by using the formula:

$QP=C0-6\times \log 2(\text{current\_AllocatedBit}/\text{predBit}QP26$ (0)), where C0 is a median of possible quantization parameter values, and
   log 2( ) is a function that calculates a logarithm to the base 2.

3. The moving image coding apparatus according to claim 1, wherein the target code amount setting unit sets a target code amount targetBit as a code amount to be allocated to 2×k1 macroblocks, where k1 is a natural number, and the quantization parameter determination unit includes a FIFO (First In First Out) SATD (Sum of Absolute Transformed Distances) storage configured to store sums of absolute transformed differences for N1 macroblocks, where N1 is a natural number, and store the sum of absolute transformed differences for the current macroblock obtained by the motion estimate unit, a FIFO code amount storage configured to store code amounts for N1 macroblocks, where N1 is a natural number, and store a code amount generated when a macroblock that is one-macroblock previous to the current macroblock is coded, a current code amount calculation unit configured to obtain, from the FIFO SATD storage, a sum of absolute transformed differences recent_SATD for the current macroblock and sums of absolute transformed differences for k1 previous macroblocks, where k1 is a natural number and k1≤N1, calculate an average avrg_AllocatedBit of the sums of absolute transformed differences for the k1 previous macroblocks, obtain, from the FIFO code amount storage, code amounts for k1 previous macroblocks, where k1 is a natural number and k1≤N1, calculate an average avrg_AllocatedBit of the code amounts for the k1 previous macroblocks, and calculate a total code amount usedBit allocated to the k1 previous macroblocks, and calculate a code amount current_AllocatedBit to be allocated to the current macroblock by using the formulas:

allocatedBit=targetBit−usedBit, avrg_AllocatedBit=allocatedBit/k1, and current_AllocatedBit=avrg_AllocatedBit+coex(recent_SATD−avrg_SATD), where coe is a coefficient, a median-QP-transformed code amount calculation unit configured to obtain, from the FIFO code amount storage, a code amount recent_AllocatedBit for the macroblock that is one-macroblock previous to the current macroblock, and calculate a median-QP-transformed code amount by quantizing the obtained code amount recent_AllocatedBit using a median of possible quantization parameter values in the quantization performed by the coding unit, and a QP calculation unit configured to calculate a quantization parameter value to be used in coding the current macroblock based on the transformed code amount calculated by the median-QP-transformed code amount calculation unit for the macroblock that is one-macroblock previous to the current macroblock and the code amount current_AllocatedBit to be allocated to the current macroblock calculated by the current code amount calculation unit, and wherein the quantization parameter determination unit further includes a data transform unit configured to obtain a target code amount per macroblock IdealMBBit from the target code amount targetBit, an integration unit configured to calculate a sum sum_diff of differences between an actually generated code amount and a target code amount using a code amount recent_AllocatedBit of the macroblock that is one-macroblock previous to the current macroblock and the target code amount IdealMBBit by performing processing corresponding to the formula:

sum_diff=sum_diff+(IdealMBBit−recent_AllocatedBit), and a current code amount correction unit configured to correct the code amount current_AllocatedBit to be allocated to the current macroblock calculated by the current code amount calculation unit based on the sum sum_diff, and the QP calculation unit calculates the quantization parameter value to be used in coding the current macroblock based on the code amount current_AllocatedBit corrected by the current code amount correction unit.

4. The moving image coding apparatus according to claim 3, wherein when the code amount current_AllocatedBit to be allocated to the current macroblock calculated by the current code amount calculation unit is a code amount current_AllocatedBit0 the current code amount correction unit obtains a corrected code amount current_AllocatedBit1 by performing processing corresponding to the formula:

current_AllocatedBit1=current_AllocatedBit0+{sum_diff/(k1×2)}, and (1) when the current macroblock is an intra macroblock, the QP calculation unit calculates, based on the corrected code amount current_AllocatedBit1 obtained by the current code amount correction unit, the quantization parameter value QP to be used in coding the current macroblock by using the formula:

QP=C0−6×log 2(current_AllocatedBit1/predBitQP26 (1))

where C0 is a median of possible quantization parameter values, and log 2( ) is a function that calculates a logarithm to the base 2, and (2) when the current macroblock is an inter macroblock, the QP calculation unit calculates, based on the corrected code amount current_AllocatedBit1 obtained by the current code amount correction unit, the quantization parameter value QP to be used in coding the current macroblock by using the formula:

QP=C0−6×log 2(current_AllocatedBit1/predBitQP26 (0))

where C0 is a median of possible quantization parameter values, and log 2( ) is a function that calculates a logarithm to the base 2.

5. The moving image coding apparatus according to claim 3, wherein the median-QP-transformed code amount calculation unit obtains an intra macroblock number intraNum that is the number of intra macroblocks occurring in a predetermined previous period, and when the current macroblock is an intra macroblock and the intra macroblock number intraNum in the predetermined previous period is less than or equal to a predetermined threshold, the current code amount correction unit corrects the code amount current_AllocatedBit by performing processing corresponding to the formula:

current_AllocatedBit=current_AllocatedBit1+add1, where add1 (>0) is a code amount to be added, and the QP calculation unit calculates the quantization parameter value to be used in coding the current macroblock based on the code amount current_AllocatedBit corrected by the current code amount correction unit.

6. A method for controlling a code amount to be generated in coding a moving image signal for forming a frame image including a plurality of macroblocks, the method comprising:

setting a target code amount targetBit as a code amount to be allocated to 2×k1 macroblocks, where k1 is a natural number;

obtaining a sum of absolute transformed differences calculated from a difference image indicating a difference between a current macroblock and a corresponding image region of a reference frame image in a motion estimate process;

obtaining a sum of absolute transformed differences recent_SATD for the current macroblock and sums of absolute transformed differences for k1 previous macroblocks, where k1 is a natural number and k1≤N1, and calculating an average avrg_AllocatedBit of the sums of absolute transformed differences for the k1 previous macroblocks;

obtaining code amounts for k1 previous macroblocks, where k1 is a natural number and k1≤N1, and calculating an average avrg_AllocatedBit of the code amounts for the k1 previous macroblocks, and calculating a total code amount usedBit allocated to the k1 previous macroblocks;

calculating a code amount current_AllocatedBit to be allocated to the current macroblock by using the formulas:

allocatedBit=targetBit−usedBit, avrg_AllocatedBit=allocatedBit/$k1$, and current_AllocatedBit=avrg_AllocatedBit+coe×(recent_SATD−avrg_SATD), where coe is a coefficient;

transforming a code amount recent_AllocatedBit for a macroblock that is one-macroblock previous to the current macroblock to a transformed code amount by quantizing the code amount recent_AllocatedBit using a median of possible quantization parameter values in a quantization performed in coding the moving image signal;

storing, for an intra macroblock, the transformed code amount obtained in the step of transforming the code amount recent_AllocatedBit when the macroblock that is one-macroblock previous to the current macroblock is an intra macroblock;

storing, for an inter macroblock, the transformed code amount obtained in the step of transforming the code amount recent_AllocatedBit when the macroblock that is one-macroblock previous to the current macroblock is an inter macroblock;

calculating a first average predBitQP26(1) of median-QP-transformed code amounts for intra macroblocks stored in the step of storing the transformed code amount for an intra macroblock;

calculating a second average predBitQP26(0) of median-QP-transformed code amounts for inter macroblocks stored in the step of storing the transformed code amount for an inter macroblock; and (1) calculating a quantization parameter value to be used in coding the current macroblock based on the average predBitQP26(1) of median-QP-transformed code amounts for intra macroblocks when the current macroblock is an intra macroblock, and (2) calculating the quantization parameter value to be used in coding the current macroblock based on the average predBitQP26(0) of median-QP-transformed code amounts for inter macroblocks when the current macroblock is an inter macroblock.

7. A non-transitory computer readable storage medium storing a program enabling a computer to implement the code amount control method according to claim 6.

* * * * *